United States Patent
Zhang

(10) Patent No.: US 11,488,143 B2
(45) Date of Patent: Nov. 1, 2022

(54) RESOURCE TRANSACTION METHOD, NODE, DEVICE AND STORAGE MEDIUM

(71) Applicant: Tencent Technology (Shenzhen) Company Limited, Shenzhen (CN)

(72) Inventor: Shuai Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 463 days.

(21) Appl. No.: 16/601,453

(22) Filed: Oct. 14, 2019

(65) Prior Publication Data
US 2020/0042992 A1 Feb. 6, 2020

Related U.S. Application Data

(63) Continuation of application No. PCT/CN2017/102028, filed on Sep. 18, 2017.

(51) Int. Cl.
*G06Q 20/36* (2012.01)
*G06Q 20/06* (2012.01)
(Continued)

(52) U.S. Cl.
CPC ..... *G06Q 20/3674* (2013.01); *G06Q 20/0658* (2013.01); *G06Q 20/405* (2013.01); *H04L 9/0637* (2013.01)

(58) Field of Classification Search
CPC .......... G06Q 20/3674; G06Q 20/0658; G06Q 20/405; H04L 9/0637
(Continued)

(56) References Cited

U.S. PATENT DOCUMENTS

2016/0036803 A1 2/2016 Li
2016/0210626 A1* 7/2016 Ortiz et al.
(Continued)

FOREIGN PATENT DOCUMENTS

CN 105488665 A 4/2016
CN 105976232 A 9/2016
(Continued)

OTHER PUBLICATIONS

Dr. Gavin Wood, "Ethereum: A Secure Decentralised Generalised Transaction Ledger," Mar. 30, 2017, 32 pages, Retrieved from the Internet: https://gavwood.com/paper.pdf.
(Continued)

*Primary Examiner* — Neha Patel
*Assistant Examiner* — Yin Y Choi
(74) *Attorney, Agent, or Firm* — Morgan, Lewis & Bockius LLP

(57) ABSTRACT

A resource transaction method is applied to a blockchain system including a blockchain database, a transaction node, at least one payment node, at least one resource providing node, and at least one resource request node. The method includes: generating a transaction settlement instruction after the resource request node requests a target resource from the resource providing node on the transaction node, transmitting the transaction settlement instruction to the payment node, determining, by the payment node, that the transaction contract is an actual transaction in case of finding the transaction contract corresponding to the transaction settlement instruction from the blockchain database according to the transaction settlement instruction, and a signature of the resource request node for this resource transaction exists in the transaction contract, and transmitting, by the payment node, a transaction payment request to the resource request node.

20 Claims, 7 Drawing Sheets

(51) Int. Cl.
*G06Q 20/40* (2012.01)
*H04L 9/06* (2006.01)

(58) Field of Classification Search
USPC .......................................................... 705/67
See application file for complete search history.

(56) References Cited

U.S. PATENT DOCUMENTS

2016/0342978 A1* 11/2016 Davis et al.
2016/0358161 A1  12/2016 Cobban et al.
2018/0197173 A1*  7/2018 Durvasula et al.
2019/0034926 A1*  1/2019 Davis

FOREIGN PATENT DOCUMENTS

| CN | 106357644 A | 1/2017 |
| CN | 106529946 A | 3/2017 |
| CN | 106971302 A | 7/2017 |
| CN | 107038578 A | 8/2017 |

OTHER PUBLICATIONS

Tencent Technology, IPRP, PCT/CN2017/102028, Mar. 24, 2020, 5 pgs.
Tencent Technology, ISRWO, PCT/CN2017/102028, May 29, 2018, 7 pgs.

* cited by examiner

RESOURCE TRANSACTION METHOD, NODE, DEVICE AND STORAGE MEDIUM

CROSS-REFERENCE TO RELATED APPLICATION

This application is a continuation application of PCT/CN2017/102028, entitled "RESOURCE TRANSACTION METHOD, AND APPARATUS, NODE, AND STORAGE MEDIUM" filed on Sep. 18, 2017, which is incorporated herein by reference in its entirety.

FIELD OF THE TECHNOLOGY

This application relates to the field of e-commerce transaction technologies, and in particular, to a resource transaction method, node, and apparatus, and a storage medium.

BACKGROUND OF THE DISCLOSURE

In the current e-commerce transaction process, after a buyer places an order on an e-commerce transaction platform, the e-commerce transaction platform forwards a transaction settlement instruction to a third-party payment node. Then, the third-party payment node completes an acquiring payment business of the buyer, and clears a transaction fund to the e-commerce transaction platform. A seller applies to the e-commerce transaction platform for settling a product service payment. Then, the e-commerce transaction platform initiates a settlement instruction to the third-party payment node. Finally, the third-party payment node completes operations such as settlement and account balance checking. In this way, the entire transaction process ends.

However, because the initiation, confirmation, and supervision of the entire transaction process are all completed on the e-commerce transaction platform, on one hand, the seller controls the process completely based on the system of the e-commerce transaction platform and the commitment of integrity management of the seller in the entire settlement process, which also has some unsupervised unilateral operation risks; on the other hand, the third-party payment node can only obtain transaction settlement instructions of the buyer and the seller forwarded by the e-commerce transaction platform, the third-party payment node cannot directly obtain the transaction settlement instructions of the buyer and the seller, and the e-commerce transaction platform may further modify transaction information, and create false transactions. As can be learned, because of the lack of supervision in the transaction process of the existing mechanism, information cannot be traced, and consistency determining cannot be performed on the same transaction information by a plurality of parties. There exist many hidden dangers brought by transaction authenticity uncertainty.

SUMMARY

This application provides a resource transaction method, node, and apparatus, and a storage medium, to resolve the problem of relatively low reliability of transaction information in an e-commerce transaction process in the related technology.

One aspect of this application provides a resource transaction method. The method is applied to a blockchain system, the blockchain system includes a blockchain database, a transaction node, at least one payment node, at least one resource providing node, and at least one resource request node, and the method includes:

requesting, by the resource request node, a target resource from the resource providing node by using the transaction node;

creating, by the transaction node, a transaction contract of the target resource based on the blockchain database;

obtaining, by the payment node, a transaction settlement instruction;

determining, by the payment node, that the transaction contract is an actual transaction in a case of finding the transaction contract corresponding to the transaction settlement instruction from the blockchain database according to the transaction settlement instruction, and a signature of the resource request node for this resource transaction exists in the transaction contract; and transmitting, by the payment node, a transaction payment request to the resource request node.

One aspect of this application provides a resource transaction method. The method is applied to a blockchain system, the blockchain system includes a blockchain database, a transaction node, at least one payment node, at least one resource providing node, and at least one resource request node, and the method includes:

obtaining, by the payment node, a transaction settlement instruction transmitted by the transaction node, the transaction settlement instruction being an instruction generated after the resource request node requests a target resource from the resource providing node on the transaction node, and after the transaction node creates a transaction contract of the target resource in the blockchain database;

determining, by the payment node, that the transaction contract is an actual transaction in a case of finding the transaction contract corresponding to the transaction settlement instruction from the blockchain database according to the transaction settlement instruction, and a signature of the resource request node for this resource transaction exists in the transaction contract; and transmitting, by the payment node, a transaction payment request to the resource request node.

One aspect of this application provides a resource transaction method. The method is applied to a blockchain system, the blockchain system includes a blockchain database, a transaction node, at least one payment node, at least one resource providing node, and at least one resource request node, and the method includes:

creating, by the transaction node, a transaction contract in the blockchain database after the resource request node requests a resource from the resource providing node on the transaction node; and transmitting, by the transaction node, a transaction settlement instruction corresponding to the transaction contract to the payment node, so that the payment node determines that the transaction contract is an actual transaction after finding the transaction contract corresponding to the transaction settlement instruction from the blockchain database according to the transaction settlement instruction, and a signature of the resource request node for this resource transaction exists in the transaction contract, and transmits a transaction payment request to the resource request node.

One aspect of this application provides a resource transaction method. The method is applied to a blockchain system, the blockchain system includes a blockchain database, a transaction node, at least one payment node, at least one resource providing node, at least one resource request node, and a supervision node, and the method includes:

obtaining, by the supervision node, a transaction query instruction, and obtaining a transaction contract list in response to the transaction query instruction, the transaction contract list being created after the transaction node requests a resource transaction from the resource providing node on the resource request node;

performing, by the supervision node, transaction analysis on at least one transaction contract in the transaction contract list; and determining, by the supervision node, in a case of determining that no transaction confirmation has been performed on a target transaction contract in the transaction list by the resource request node in the target transaction contract after the target transaction contract reaches a transaction confirmation deadline, that the target transaction contract is a false transaction.

One aspect of this application provides a resource transaction method. The method is applied to a blockchain system, the blockchain system includes a blockchain database, a transaction terminal device, at least one payment terminal device, at least one resource providing terminal device, and at least one resource request terminal device, and the method includes:

requesting, by the resource request terminal device, a target resource from the resource providing terminal device by using the transaction terminal device;

creating, by the transaction terminal device, a transaction contract of the target resource based on the blockchain database;

obtaining, by the payment terminal device, a transaction settlement instruction;

determining, by the payment terminal device, that the transaction contract is an actual transaction in a case of finding the transaction contract corresponding to the transaction settlement instruction from the blockchain database according to the transaction settlement instruction, and a signature of the resource request terminal device for this resource transaction exists in the transaction contract; and transmitting, by the payment terminal device, a transaction payment request to the resource request terminal device.

One aspect of this application provides a resource transaction method. The method is applied to a blockchain system, the blockchain system includes a blockchain database, a transaction terminal device, at least one payment terminal device, at least one resource providing terminal device, and at least one resource request terminal device, and the method includes:

obtaining, by the payment terminal device, a transaction settlement instruction transmitted by the transaction terminal device, the transaction settlement instruction being an instruction generated after the resource request terminal device requests a target resource from the resource providing terminal device on the transaction terminal device, and after the transaction terminal device creates a transaction contract of the target resource in the blockchain database;

determining, by the payment terminal device, that the transaction contract is an actual transaction in a case of finding the transaction contract corresponding to the transaction settlement instruction from the blockchain database according to the transaction settlement instruction, and a signature of the resource request terminal device for this resource transaction exists in the transaction contract; and transmitting, by the payment terminal device, a transaction payment request to the resource request terminal device.

One aspect of this application provides a resource transaction method. The method is applied to a blockchain system, the blockchain system includes a blockchain database, a transaction terminal device, at least one payment terminal device, at least one resource providing terminal device, and at least one resource request terminal device, and the method includes:

creating, by the transaction terminal device, a transaction contract in the blockchain database after the resource request terminal device requests a resource from the resource providing terminal device on the transaction terminal device; and transmitting, by the transaction terminal device, a transaction settlement instruction corresponding to the transaction contract to the payment terminal device, so that the payment terminal device determines that the transaction contract is an actual transaction after finding the transaction contract corresponding to the transaction settlement instruction from the blockchain database according to the transaction settlement instruction, and a signature of the resource request terminal device for this resource transaction exists in the transaction contract, and transmits a transaction payment request to the resource request terminal device.

One aspect of this application provides a resource transaction method. The method is applied to a blockchain system, the blockchain system includes a blockchain database, a transaction terminal device, at least one payment terminal device, at least one resource providing terminal device, at least one resource request terminal device, and a supervision terminal device, and the method includes:

obtaining, by the supervision terminal device, a query instruction, and obtaining a transaction contract list in response to the query instruction, the transaction contract list being created after the transaction terminal device requests a resource transaction from the resource providing terminal device on the resource request terminal device;

performing, by the supervision terminal device, transaction analysis on at least one transaction contract in the transaction contract list; and determining, by the supervision terminal device, in a case of determining that no transaction confirmation has been performed on a target transaction contract in the transaction list by the resource request terminal device in the target transaction contract after the target transaction contract reaches a transaction confirmation deadline, that the target transaction contract is a false transaction.

One aspect of this application provides a blockchain system, having a function for implementing the corresponding resource transaction method provided above. The function may be implemented by using hardware, or may be implemented by executing corresponding software by using hardware. The hardware or software includes one or more units or modules corresponding to the foregoing function, and the unit or module may be software and/or hardware.

In a possible design, the blockchain system includes a blockchain database, a transaction node, at least one payment node, at least one resource providing node, and at least one resource request node.

The resource request node is configured to request a target resource from the resource providing node by using the transaction node;

the transaction node is configured to create a transaction contract of the target resource based on the blockchain database; and the payment node is configured to obtain a transaction settlement instruction, and determine that the transaction contract is an actual transaction in a case of finding the transaction contract corresponding to the transaction settlement instruction from the blockchain database according to the transaction settlement instruction, and a signature of the resource request node for this resource transaction exists in the transaction contract; and transmit a transaction payment request to the resource request node.

One aspect of this application provides a payment node, having a function for implementing the corresponding resource transaction method provided above. The function may be implemented by using hardware, or may be implemented by executing corresponding software by using hardware. The hardware or software includes one or more modules corresponding to the foregoing function, and the module may be software and/or hardware.

In a possible design, the payment node is applied to a blockchain system, the blockchain system includes a blockchain database, a transaction node, at least one payment node, at least one resource providing node, and at least one resource request node, and the payment node includes:

a transceiver module, configured to obtain a transaction settlement instruction transmitted by the transaction node, the transaction settlement instruction being an instruction generated after the resource request node requests a target resource from the resource providing node on the transaction node, and after the transaction node creates a transaction contract of the target resource in the blockchain database; and a processing module, configured to determine that the transaction contract is an actual transaction in a case of finding the transaction contract corresponding to the transaction settlement instruction from the blockchain database according to the transaction settlement instruction, and a signature of the resource request node for this resource transaction exists in the transaction contract, and transmit a transaction payment request to the resource request node.

One aspect of this application provides a transaction node, having a function for implementing the corresponding resource transaction method provided above. The function may be implemented by using hardware, or may be implemented by executing corresponding software by using hardware. The hardware or software includes one or more units corresponding to the foregoing function, and the unit may be software and/or hardware.

In a possible design, the transaction node is applied to a blockchain system, the blockchain system includes a blockchain database, a transaction node, at least one payment node, at least one resource providing node, and at least one resource request node, and the transaction node includes:

a processing unit, configured to create a transaction contract in the blockchain database after the resource request node requests a resource from the resource providing node on the transaction node; and a transceiver unit, configured to transmit a transaction settlement instruction corresponding to the transaction contract to the payment node, so that the payment node determines that the transaction contract is an actual transaction after finding the transaction contract corresponding to the transaction settlement instruction from the blockchain database according to the transaction settlement instruction, and a signature of the resource request node for this resource transaction exists in the transaction contract, and transmits a transaction payment request to the resource request node.

One aspect of this application provides a supervision node, having a function for implementing the corresponding resource transaction method provided above. The function may be implemented by using hardware, or may be implemented by executing corresponding software by using hardware. The hardware or software includes one or more modules corresponding to the foregoing function, and the module may be software and/or hardware.

In a possible design, the supervision node is applied to a blockchain system, the blockchain system includes a blockchain database, a transaction node, at least one payment node, at least one resource providing node, at least one resource request node, and a supervision node, and the supervision node includes:

a transceiver submodule, configured to obtain a query instruction, and obtain a transaction contract list in response to the query instruction, the transaction contract list being created after the transaction node requests a resource transaction from the resource providing node on the resource request node; and a processing submodule, configured to perform transaction analysis on at least one transaction contract in the transaction contract list; and determine, in a case of determining that no transaction confirmation has been performed on a target transaction contract in the transaction list by the resource request node in the target transaction contract after the target transaction contract reaches a transaction confirmation deadline, that the target transaction contract is a false transaction.

One aspect of this application provides a blockchain system, having a function for implementing the corresponding resource transaction method provided above. The function may be implemented by using hardware, or may be implemented by executing corresponding software by using hardware. The hardware or software includes one or more units or modules corresponding to the foregoing function, and the unit or module may be software and/or hardware.

In a possible design, the blockchain system includes a blockchain database, a transaction terminal device, at least one payment terminal device, at least one resource providing terminal device, and at least one resource request terminal device.

The resource request terminal device is configured to request a target resource from the resource providing terminal device by using the transaction terminal device;

the transaction terminal device is configured to create a transaction contract of the target resource based on the blockchain database; and the payment terminal device is configured to obtain a transaction settlement instruction, and determine that the transaction contract is an actual transaction in a case of finding the transaction contract corresponding to the transaction settlement instruction from the blockchain database according to the transaction settlement instruction, and a signature of the resource request terminal device for this resource transaction exists in the transaction contract; and transmit a transaction payment request to the resource request terminal device.

One aspect of this application provides a payment terminal device, having a function for implementing the corresponding resource transaction method provided above. The function may be implemented by using hardware, or may be implemented by executing corresponding software by using hardware. The hardware or software includes one or more modules corresponding to the foregoing function, and the module may be software and/or hardware.

In a possible design, the payment terminal device is applied to a blockchain system, the blockchain system includes a blockchain database, a transaction terminal device, at least one payment terminal device, at least one resource providing terminal device, and at least one resource request terminal device, and the payment terminal device includes:

a transceiver module, configured to obtain a transaction settlement instruction transmitted by the transaction terminal device, the transaction settlement instruction being an instruction generated after the resource request terminal device requests a target resource from the resource providing terminal device on the transaction terminal device, and after the transaction terminal device creates a transaction contract of the target resource in the blockchain database; and a processing module, configured to determine that the transaction contract is an actual transaction in a case of finding the transaction contract corresponding to the transaction settlement instruction from the blockchain database according to the transaction settlement instruction, and a signature of the resource request terminal device for this resource transaction exists in the transaction contract, and transmit a transaction payment request to the resource request terminal device.

One aspect of this application provides a transaction terminal device, having a function for implementing the corresponding resource transaction method provided above. The function may be implemented by using hardware, or may be implemented by executing corresponding software by using hardware. The hardware or software includes one or more units corresponding to the foregoing function, and the unit may be software and/or hardware.

In a possible design, the transaction terminal device is applied to a blockchain system, the blockchain system includes a blockchain database, a transaction terminal device, at least one payment terminal device, at least one resource providing terminal device, and at least one resource request terminal device, and the transaction terminal device includes:

a processing unit, configured to create a transaction contract in the blockchain database after the resource request terminal device requests a resource from the resource providing terminal device on the transaction terminal device; and a transceiver unit, configured to transmit a transaction settlement instruction corresponding to the transaction contract to the payment terminal device, so that the payment terminal device determines that the transaction contract is an actual transaction after finding the transaction contract corresponding to the transaction settlement instruction from the blockchain database according to the transaction settlement instruction, and a signature of the resource request terminal device for this resource transaction exists in the transaction contract, and transmits a transaction payment request to the resource request terminal device.

One aspect of this application provides a supervision terminal device, having a function for implementing the corresponding resource transaction method provided above. The function may be implemented by using hardware, or may be implemented by executing corresponding software by using hardware. The hardware or software includes one or more modules corresponding to the foregoing function, and the module may be software and/or hardware.

In a possible design, the supervision terminal device is applied to a blockchain system, the blockchain system includes a blockchain database, a transaction terminal device, at least one payment terminal device, at least one resource providing terminal device, at least one resource request terminal device, and a supervision terminal device, and the supervision terminal device includes:

a transceiver submodule, configured to obtain a query instruction, and obtain a transaction contract list in response to the query instruction, the transaction contract list being created after the transaction terminal device requests a resource transaction from the resource providing terminal device on the resource request terminal device; and a processing submodule, configured to perform transaction analysis on at least one transaction contract in the transaction contract list; and determine, in a case of determining that no transaction confirmation has been performed on a target transaction contract in the transaction list by the resource request terminal device in the target transaction contract after the target transaction contract reaches a transaction confirmation deadline, that the target transaction contract is a false transaction.

One aspect of this application provides a computer readable storage medium, the computer readable storage medium stores instructions, and when run in a computer, the instructions cause the computer to perform the method in the foregoing aspects.

One aspect of this application provides a resource transaction apparatus, including at least one connected processor, a memory, and a transceiver. The memory is configured to store program code, and the processor is configured to invoke the program code in the memory to perform the method in the foregoing aspects.

INDUSTRIAL PRACTICABILITY

By using the solutions provided in the embodiments of this application, because interactions between the nodes are based on a blockchain technology, decentralization can be performed to ensure data consistency. Therefore, in any transaction process, after obtaining a transaction settlement instruction transmitted by the transaction node, the payment node may first directly query, from the blockchain database according to the transaction settlement instruction, whether a transaction contract corresponding to the transaction settlement instruction exists, and determine that the transaction contract is an actual transaction if the corresponding transaction contract exists, and a signature of the resource request node for this resource transaction exists in the transaction contract. As can be learned, based on characteristics of data consistency of the blockchain, and the resource transaction triggered in the environment of supervision of a plurality of parties, through determining of the two levels, the payment node can determine whether the transaction is real or false or whether the transaction is tampered with by the transaction node, to improve authenticity of the resource transaction, to effectively prevent a transaction clearing instruction from being tampered with or falsely generated by the transaction node, thereby reducing risks of paying for false transactions, and reducing fund security risks brought by a lack of previous supervision.

DESCRIPTION OF EMBODIMENTS

In the specification, claims, and accompanying drawings of this application, the terms "first", "second", and so on are intended to distinguish between similar objects rather than indicating a specific order. It is to be understood that, data used in this way is exchangeable in a proper case, so that the embodiments described herein can be implemented in another order except the content shown or described herein. In addition, the terms "include", "comprise", and any variants thereof are intended to cover a non-exclusive inclusion. For example, a process, method, system, product, or device that includes a series of steps or modules is not limited to the steps or modules that are clearly listed, but may include other steps or modules that are not clearly listed or that are inherent to the process, method, product, or device. Division of the modules in this application is merely logical division and may be other division manners during implementation in actual application. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be in electronic or other similar forms, which are not limited in this application. Moreover, the modules or submodules described as separate parts may or may not be physically separate, and may or may not be physical modules, or may be distributed in a plurality of circuit modules. Some or all modules thereof may be selected based on an actual requirement, to implement an objective of the solution in this embodiment.

The embodiments of this application provide a resource transaction method, node, and apparatus, and a storage medium. The solutions provided in this application are mainly applied to the e-commerce field, for example, applied to Business-to-Customer (B2C), Customer-to-Customer (C2C), or Business-to-Business (B2B), which is not specifically limited in this application.

Figure 1:
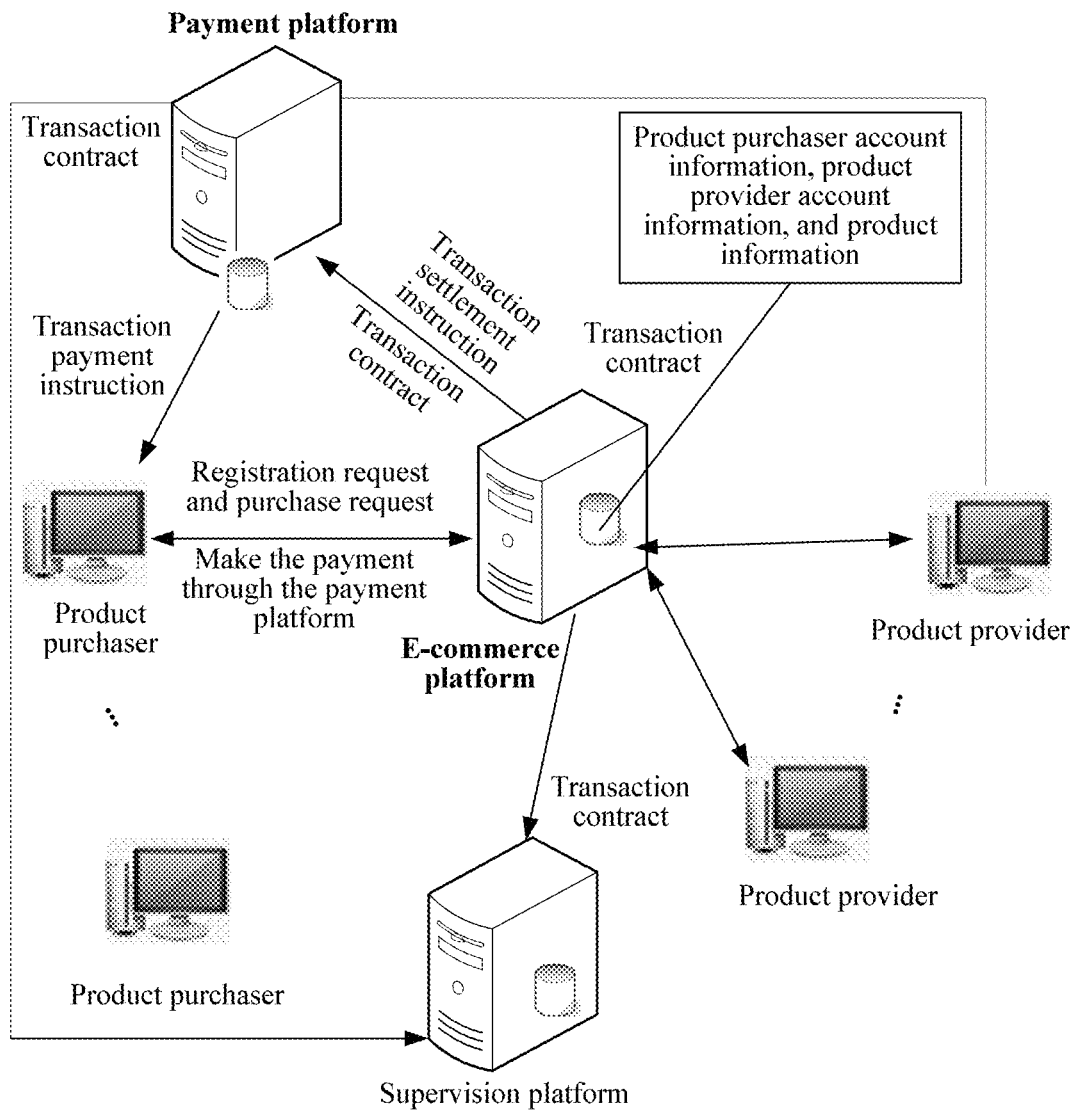
FIG. 1 is a schematic structural diagram of a network topology of a blockchain system according to an embodiment of this application.

FIG. 1 is a schematic structural diagram of a network topology of a blockchain system according to an embodiment of this application, and is also a schematic diagram of a product purchase process. A product purchaser, a product provider, a payment platform, and an e-commerce transaction platform are all deployed based on a blockchain technology, and belong to the same blockchain system. The blockchain system may be based on a private blockchain or a consortium blockchain, and the blockchain system may include at least one blockchain database (may be a private and/or consortium blockchain). The product purchaser, the product provider, the payment platform, and the e-commerce transaction platform respectively have a corresponding blockchain account and blockchain address in the blockchain system, and may respectively set a permission in the blockchain system according to needs, which are not specifically limited in this application. The product purchaser, the product provider, the payment platform, and the e-commerce transaction platform may all query data having permissions in the blockchain database. Behaviors such as a transaction behavior, a payment behavior, a clearing behavior, and a query behavior between the product purchaser, the product provider, the payment platform, and the e-commerce transaction platform may all performed based on the blockchain system.

Specifically, the product purchaser purchases a product from the product provider on the e-commerce transaction platform by using the e-commerce transaction platform, and the e-commerce transaction platform creates a transaction contract of this product transaction, where the transaction contract includes transaction information of this product transaction, and synchronizes the transaction contract to the blockchain database. The e-commerce transaction platform transmits a transaction settlement instruction to the payment platform. After receiving the transaction settlement instruction, the payment platform may obtain the corresponding transaction contract in the blockchain database, and then may query for blockchain identity information of the product purchaser and the product provider in the transaction contract from the blockchain database. After determining that blockchain identities of the product purchaser and the product provider in the transaction contract are legal, the payment platform determines whether a signature of the product purchaser for this transaction contract exists in the transaction contract, and may determine that this product transaction is an actual transaction if the signature exists. Then, the payment platform initiates a transaction payment instruction to the product purchaser, so that the product purchaser makes the payment. After the payment is successful, the payment platform may settle the fund to the e-commerce transaction platform, and then the e-commerce transaction platform clears the transaction fund to the product provider. The specific clearing process is not described in this application.

The blockchain system in this application is based on a blockchain technology, so that decentralization can be performed to ensure transaction data consistency. The blockchain system may be based on a private blockchain or a consortium blockchain. The e-commerce transaction platform may create a transaction contract based on a blockchain, and the payment platform may check, based on the blockchain database, whether the transaction contract generated in each product transaction is real or false. In addition, the product purchaser, the product provider, the payment platform, and the e-commerce transaction platform may all check the transaction contract based on the blockchain database, to finally achieve the objective of supervision of a plurality of parties, and ensure rights and interests of interested parties of transactions.

The blockchain technology refers to a brand new distributed basic architecture and a calculation manner for verifying and storing data by using a blockchain type data structure, generating and updating data by using a distributed node consensus algorithm, ensuring security of data transmission and access by using a cryptology manner, and programming and operating data by using a smart contract formed by automated script code.

The blockchain refers to a database account book, which may record all transaction records, and verify effectiveness of information. The blockchain has features such as decentralization, trustless, collective maintenance, a reliable database, an open source, and anonymity. The blockchain of this application is based on a consensus mechanism, and data in the blockchain cannot be deleted or modified, and can only be increased and traced, thereby reducing forgery risks.

To resolve the foregoing technical problems, the embodiments of this application mainly provide the following technical solutions:

Nodes (including at least one payment node, at least one resource request node, at least one resource providing node, and a transaction node, and may further include a supervision node) participating in the entire resource transaction are all deployed in the blockchain system, so that interactions between the nodes are based on the blockchain technology, and decentralization can be performed to ensure data consistency. In any transaction process, after obtaining a transaction settlement instruction transmitted by the transaction node, the payment node may first directly query, from the blockchain database according to the transaction settlement instruction, whether a transaction contract corresponding to the transaction settlement instruction exists, and determine that the transaction contract is an actual transaction if the corresponding transaction contract exists, and a signature of the resource request node for this resource transaction exists in the transaction contract. As can be learned, based on characteristics of data consistency of the blockchain, and the resource transaction triggered in the environment of supervision of a plurality of parties, through determining of the two levels, the payment node can determine whether the transaction is real or false or whether the transaction is tampered with by the transaction node, to improve authenticity of the resource transaction, to effectively prevent a transaction clearing instruction from being tampered with or falsely generated by the transaction node, thereby reducing risks of paying for false transactions, and reducing fund security risks brought by a lack of previous supervision.

Figure 2:
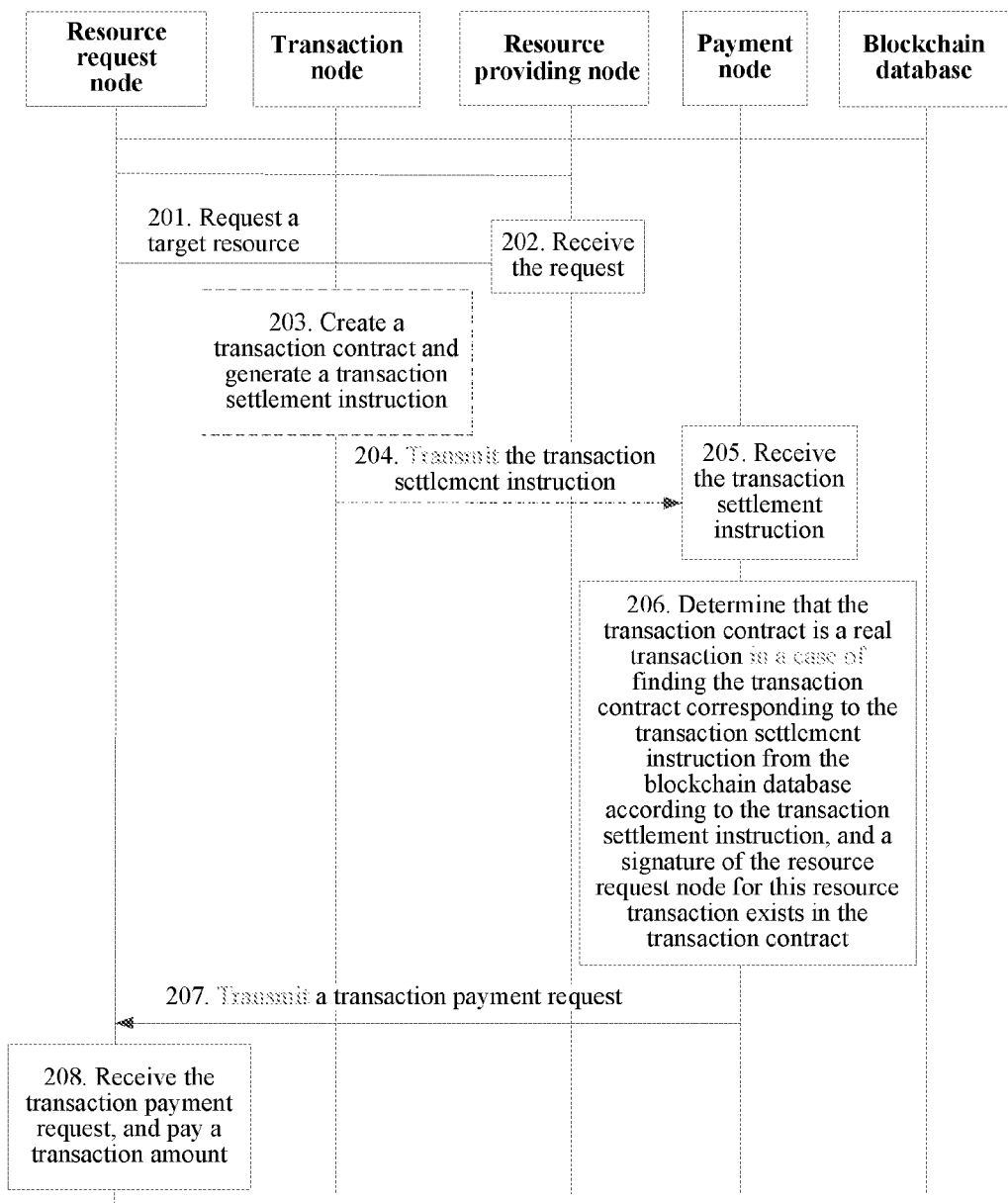
FIG. 2 is a flowchart of a resource transaction method according to an embodiment of this application.

Referring to FIG. 2, the following describes the resource transaction method provided in the embodiments of this application by using an example. The method is applied to a blockchain system. The blockchain system includes a transaction node, at least one payment node, at least one resource providing node, at least one resource request node, and a blockchain database, and may further include a supervision node. The transaction node is configured to provide a resource transaction service for the resource providing node and the resource request node. The blockchain database may be independently deployed or may be deployed in the supervision node. The specific deployment is not limited in this application. The transaction node, the payment node, the resource providing node, the resource request node, and the supervision node in the embodiments of this application may be virtual devices in logical division, or may be independent entity devices. It may be regarded that the transaction node is equal to the transaction terminal device in function, the payment node is equal to the payment terminal device in function, the resource providing node is equal to the resource providing terminal device in function, the resource request node is equal to the resource request terminal device in function, and the supervision node is equal to the supervision terminal device in function, which are not distinguished in subsequent embodiments. For ease of description, the transaction node, the payment node, the resource providing node, the resource request node, and the supervision node are used as examples. The following first describes an optional deployment manner of the blockchain system in the embodiments of this application:

Generate a blockchain: Generate a blockchain according to a blockchain protocol.

Deploy a blockchain: During deployment of the blockchain, nodes participating in a resource transaction all need to register a blockchain account in the blockchain database. The resource request node and the resource providing node may register in the blockchain database spontaneously, or the transaction node or the payment node may register in the blockchain database for the resource request node and the resource providing node. The specific registration manner is not limited in this application. It may be understood that, the registration process of each node in the blockchain database is essentially adding the node to the blockchain system.

During the registration of the blockchain account, both the resource request node and the resource providing node may obtain a unique blockchain account for performing the resource transaction on the transaction node, so as to perform identity recognition subsequently during the resource transaction. After the registration is completed, both the resource request node and the resource providing node may obtain a blockchain account identifier, a node identifier, a blockchain address, an operation password, an account public key, and an account private key.

The account private key may be used to sign a transaction contract, and the account public key may be used to authenticate the transaction contract. The blockchain account address and the operation password may be used for a node (the resource request node or the resource providing node) to log in to the blockchain database to perform operations such as querying, reviewing, and managing the transaction contract.

As can be learned, based on the blockchain database, a risk of the transaction node intentionally or accidentally hijacking an information entry can be avoided, and bottom implementation for the blockchain database is 0 aware to users. In some implementations, an account management module may be classified from the blockchain database, and may host account information of the nodes by using a secure manner. The specifically used secure manner is not limited in this application.

Write data into the blockchain database: When the nodes in the blockchain system write data into the blockchain database, to-be-written data needs to be transmitted to other nodes in the blockchain system in addition to the nodes, so that other nodes participate in a consensus. After receiving consensus result information transmitted by other nodes, the nodes may determine, according to the consensus result information, whether the consensus is reached.

The nodes in the blockchain system may all generate data on their own platforms, and synchronize some or all generated data to the blockchain database based on the consensus mechanism. In this application, a permission for each node to access data in the blockchain database may be set, or data in the blockchain database may be maintained in an encrypted manner. The specific manner for the nodes to access the data in the blockchain database is not limited in this application.

The blockchain system may maintain at least one blockchain database, and the blockchain database may be a private blockchain database or a consortium blockchain database. The specific deployment type is not limited in this application. For ease of description, a blockchain database is used as an example in the embodiments of this application.

Based on the deployment of the blockchain system, the embodiments of this application may mainly include the following operations:

201. The resource request node requests a target resource from the resource providing node by using the transaction node.

After selecting an interested target resource based on the transaction node, the resource request node enters a target resource obtaining application interface, that is, enters a resource providing application interface of the resource providing node to which the target resource belongs. The resource request node may initiate a request to the resource providing node on the target resource obtaining application interface, to obtain the target resource. For example, after a buyer searches for a product on an e-commerce transaction platform, and finds an interested product A, the buyer may directly click the product A to enter a detail interface of the product A. Then, the buyer may click to purchase on the detail interface of the product A, that is, transmit a purchase request to a seller to which the product A belongs.

202. The resource providing node receives the request of the resource request node for obtaining the target resource.

The resource providing node may view, in real time based on the transaction node, whether there is a resource obtaining request, and may perform a corresponding operation on the request after receiving the request for obtaining the target resource. For example, the seller views, in real time on the e-commerce transaction platform, whether there is a notification of a purchase request. The notification manner may be a text, an e-mail, or an instant message, which is not specifically limited in this application.

203. The transaction node creates a transaction contract of the target resource based on the blockchain database.

Optionally, the transaction node may further generate a transaction settlement instruction corresponding to the transaction contract.

The transaction contract in the embodiments of this application includes transaction information of the transaction, and may further include a trigger condition of a plurality of transaction operations, and operation instructions of transaction operations that correspond to the transaction contract and that are performed by the transaction node, the payment node, the resource providing node, and the resource request node within a lifetime of the transaction contract. The transaction information may include all information related to the transaction such as related information of participators of the transaction and transaction state information. For example, the transaction information includes a blockchain address of the resource request node, and a blockchain address of the resource providing node, transaction element information, payment clearing document information, and the like.

Specifically, the transaction contract may refer to a sorted set of a series of instructions, and whether to transmit an operation instruction of a transaction operation corresponding to the transaction contract is determined automatically according to whether the trigger condition is achieved. For example, when the buyer triggers a business term for a transaction contract, or a lifetime of a transaction contract is expired (for example, the buyer finally confirms the time of receipt), the buyer may transmits a corresponding operation instruction, executes a corresponding operation instruction, and actively initiates a fund clearing process.

Optionally, the transaction contract may further include a transaction settlement instruction, and a trigger condition for triggering to transmit the transaction settlement instruction is set. When the set trigger condition is met, the transaction node may be automatically triggered to transmit the transaction settlement instruction to the payment node.

After creating the transaction contract of the target resource, the transaction node stores the transaction contract to the blockchain database.

Optionally, in some embodiments of this application, the following may be further included:

204. The transaction node transmits a transaction settlement instruction corresponding to the transaction contract to the payment node.

The transaction settlement instruction may exist in the transaction contract, and after completing the creation of the transaction contract, the transaction node may trigger, by using a pre-defined program in the transaction contract, the transaction node to transmit the transaction settlement instruction to the payment node.

The transaction settlement instruction may alternatively be independently generated by the transaction node after the transaction node creates the transaction contract completely, and is then transmitted to the payment node. The manner or source for the payment node to receive the transaction settlement instruction is not specifically limited in this application.

For example, the e-commerce transaction platform creates a transaction contract, and the transaction contract may include a series of programs. When these programs meet a trigger condition of a response, a corresponding operation is performed. For example, the e-commerce transaction platform may be automatically triggered to transmit a payment instruction to the payment platform one second after it is defined in the transaction contract that the transaction contract is synchronized to the blockchain database.

205. The payment node obtains the transaction settlement instruction transmitted by the transaction node.

The transaction settlement instruction may be actively transmitted by the transaction node, or may be transmitted by the transaction node automatically triggered after a related program in the transaction contract meets the trigger condition.

206. The payment node determines that the transaction contract is an actual transaction in a case of finding the transaction contract corresponding to the transaction settlement instruction from the blockchain database according to the transaction settlement instruction, and a signature of the resource request node for this resource transaction exists in the transaction contract.

Optionally, the payment node may further query, according to blockchain account information of the resource request node and the resource providing node disclosed in the transaction contract, in data stored in the blockchain database, whether blockchain accounts of the resource request node and the resource providing node in the transaction contract are legal blockchain accounts. For example, the payment platform may query, in the blockchain database according to account information of a buyer and a seller that is disclosed in the transaction contract, whether the buyer and the seller are legal blockchain accounts of the blockchain system. If the buyer and the seller are illegal blockchain accounts, the payment platform may determine that the transaction contract is forged. If the buyer and the seller are legal blockchain accounts, the payment platform may continue to determine whether the transaction contract has the signature of the buyer, and if the transaction contract has the signature, the payment platform may determine that the transaction contract is a representation of a real purchase behavior of the buyer.

The order of the payment node checking the legality of the blockchain accounts of the resource request node and the resource providing node, and checking whether the signature of the resource request node exists in the transaction contract is not limited in this application.

207. The payment node transmits a transaction payment request to the resource request node.

For example, after determining that this transaction contract is an actual transaction contract, the payment platform may transmit a payment instruction to the buyer in the transaction contract.

208. The resource request node receives the transaction payment request, and pays a transaction amount of this resource transaction according to the transaction payment request.

Compared with the related technology, in the solutions provided in the embodiments of this application, because interactions between the nodes are based on a blockchain technology, decentralization can be performed to ensure data consistency. Therefore, in any transaction process, after obtaining a transaction settlement instruction transmitted by the transaction node, the payment node may first directly query, from the blockchain database according to the transaction settlement instruction, whether a transaction contract corresponding to the transaction settlement instruction exists, and determine that the transaction contract is an actual transaction if the corresponding transaction contract exists, and a signature of the resource request node for this resource transaction exists in the transaction contract. As can be learned, based on characteristics of data consistency of the blockchain, and the resource transaction triggered in the environment of supervision of a plurality of parties, through determining of the two levels, the payment node can determine whether the transaction is real or false or whether the transaction is tampered with by the transaction node, to improve authenticity of the resource transaction, to effectively prevent a transaction clearing instruction from being tampered with or falsely generated by the transaction node, thereby reducing risks of paying for false transactions, and reducing fund security risks brought by a lack of previous supervision.

On one hand, specifically, the payment node serves as an execution party of the resource transaction. Because during generating of the transaction contract, the transaction contract is signed by the resource request node by using an account private key of a user, it indicates that the resource request node has really and effectively confirmed this resource transaction in the transaction contract. The account private key used by the resource request node to sign is only known to the resource request node, but is unknown to the transaction node, the resource providing node, and the payment node. Therefore, this resource transaction may be regarded as an actual transaction as long as the payment node finds that the transaction contract has been signed by the resource request node. In this way, authenticity of the resource transaction can be improved to some extent. As can be learned, compared with the existing mechanism, before initiating the transaction payment request to the resource request node, the payment node may first verify authenticity of the transaction contract. In addition, when triggering a transaction settlement condition, the transaction contract may further forcibly trigger to perform a transaction settlement operation. By using the resource transaction triggered in the environment of supervision of a plurality of parties in this application, to effectively prevent a transaction clearing instruction from being tampered with or falsely generated by the transaction node, and fund security risks brought by a lack of previous supervision.

On the other hand, for example, even though the buyer/seller in the transaction contract can be found in the blockchain, it cannot indicate that the transaction contract is initiated by the buyer. It may be regarded that the buyer is performing a real purchase behavior only after the buyer signs. If no actual transaction behavior is performed between the buyer and the seller, but the transaction node creates a transaction contract based on the blockchain database, and blockchain accounts of the buyer and the seller in the transaction contract can both be found in the blockchain database, for this case, it cannot indicate that the transaction contract is initiated by the buyer. Therefore, the payment node cannot simply regard that this transaction is an actual transaction, but needs to confirm whether a signature of the buyer exists in the transaction contract. If the signature of the buyer exists, it may be regarded that the buyer is performing a real purchase behavior. The solutions of the embodiments of this application can well wipe out this type of false transactions.

Optionally, in some embodiments of this application, resource transactions not confirmed by the resource request node may further be set, to reduce the frequency of unnecessarily triggering to push the transaction settlement instruction to the resource request node. Specifically, the following steps may be included:

The payment node determines that the transaction contract is a false transaction in a case of not finding the transaction contract corresponding to the transaction settlement instruction from the blockchain database according to the transaction settlement instruction, or finding the transaction contract corresponding to the transaction settlement instruction from the blockchain database, but no signature of the resource request node for this resource transaction exists in the transaction contract, and transmits a transaction payment rejection response to the transaction node.

Optionally, in some embodiments of this application, the method further includes:

After obtaining the target resource provided by the resource providing node, the resource request node may perform receipt confirmation on this resource transaction. Correspondingly, the transaction contract also triggers a corresponding transaction operation, and a transaction state of this resource transaction also changes accordingly. Certainly, if after receiving the target resource, the resource request node cannot perform receipt confirmation on this resource transaction within a receipt confirmation time set in the transaction contract, the transaction contract in the embodiments of this application may also automatically trigger a receipt confirmation operation for this resource transaction, for example, after the buyer receives the product of the seller, if the transaction contract agrees that the buyer needs to confirm receipt within seven days after the receipt, but the buyer does not actively confirm receipt. If the buyer has still not performed the receipt confirmation operation seven days after the receipt, the transaction contract may automatically trigger the process operation of confirming receipt.

In the embodiments of this application, the payment node may further dynamically trace a fulfillment state of the transaction contract according to the transaction state of the transaction contract. Specifically, the payment node queries a currently performed transaction operation in the transaction contract in a case that the resource request node confirms that this resource transaction is completed in the transaction contract, or the payment node determines that the transaction contract reaches a transaction confirmation deadline, and performs, according to the currently performed transaction operation in the transaction contract, a next transaction operation that meets the trigger condition in the transaction contract.

The transaction operation may include payment transfer, and resource receipt and notification. The payment transfer refers to transferring a resource payment requested by a payment of the resource request node to the resource providing node. The notification is used for notifying the resource request node and the resource providing node of the current transaction state of the transaction contract.

For example, when a contract includes ten processes (including process 1, process 2 . . . and process 10), if the current process to process 9 are found, and a confirmation deadline of the transaction contract is reached, the payment node in the embodiments of this application may directly initiate a transaction confirmation process represented by process 10. For example, it is stipulated in the contract that receipt shall be confirmed within seven days. If the buyer has still not confirmed receipt when the seventh day is reached, because the payment node of the embodiments of this application is based on the blockchain system, the payment node can query the transaction contract in the blockchain database. Therefore, the payment node may directly initiate an automatic confirmation transaction according to the transaction contract, and then may calculate a transaction fund of this transaction in a fund account of the resource providing node in the transaction contract. Compared with the existing mechanism in which the payment node cannot see specific content of the transaction contract, and can settle the fund to the seller only after passively waiting for the transaction contract to automatically trigger the receipt confirmation process, the payment node of the embodiments of this application can track the progress of the transaction contract in real time, and may perform determining by the payment node itself, thereby reducing unnecessary waits.

Optionally, in some embodiments of this application, the payment node has a restricted viewing permission, and the restricted viewing permission means that the payment node only has a permission to view transaction disclosure information in the transaction contract. The transaction disclosure information includes some information in the transaction contract. The transaction disclosure information is necessary information in a payment process. The transaction disclosure information may further include a blockchain address of the resource request node, a blockchain address of the resource providing node, transaction element information, and payment clearing document information, and signature information of the resource request node for the transaction contract.

In this way, the payment node may query the transaction disclosure information of this resource transaction from the transaction contract after finding the transaction contract from the blockchain database according to the transaction settlement instruction Then, account information of the resource request node in the transaction contract, account information of the resource providing node, and transaction information of the resource request node and the resource providing node are queried according to the transaction disclosure information, so as to check whether identities of the resource providing node and the resource request node in the transaction contract are real. The transaction disclosure information may further be used for the payment node to perform concurrent checking work and post checking work on movement of funds in the payment node.

Optionally, the payment node may further determine, according to the find transaction disclosure information, whether the transaction contract is signed by the resource request node for this resource transaction. The payment node determines that the transaction contract is an actual transaction if determining, according to the transaction disclosure information, that the resource request node signs the transaction contract for this resource transaction.

Optionally, in some embodiments of this application, the method further includes:

After the resource request node completes the payment of this resource transaction, the payment node may further transmit a confirmation response used for indicating that the payment of the transaction contract is successful to the transaction node.

The blockchain database creates a sub-account settlement contract of the transaction node after receiving a confirmation response that is transmitted by the payment node and that indicates that the payment of the transaction contract is successful, so that the resource providing node, the resource request node, the payment node, and the supervision node query this resource transaction.

The sub-account settlement contract refers to a sub-account settlement contract owned by nodes based on a consensus mechanism in a blockchain system respectively. Each node locally maintains its own sub-account settlement contract, for account checking at any time, and update of any node for the sub-account settlement contract needs to be confirmed by other nodes. The sub-account settlement contract is only for nodes participating in the same resource transaction. For example, the transaction node may have performed resource transactions with a plurality of resource providing nodes, or have had fund settlements with a plurality of payment nodes, or a resource request node have performed resource transactions with a plurality of resource providing nodes. In this way, each node may maintain a plurality of different types of sub-account settlement contracts, but nodes participating in the same resource transaction may all maintain the same sub-account settlement contract. For example, a resource request node A purchases a product D on a resource providing node C by using a transaction node B, and the resource request node A pays for the product D on a payment node E. Therefore, the resource request node A, the transaction node B, the resource providing node C, and the payment node E may all maintain a transaction contract about the product D. Therefore, the transaction contract respectively maintained by the resource request node A, the transaction node B, the resource providing node C, and the payment node E may be referred to as a sub-account transaction contract.

Because the blockchain system in the embodiments of this application is based on the consensus mechanism, if any node (for example, may be a node of any party participating in the resource transaction) in the blockchain system needs to modify any data in the transaction contract, the node may modify the data only when agreeing with nodes having interest relationships in the transaction contract. The nodes having interest relationships in the transaction contract refer to the resource providing node for providing resources, the resource request node for paying for the resource transaction, and the transaction node and the payment node for collecting commissions. As can be learned, the transaction contract recorded on the blockchain database may be regarded to be unilateral tamper-resistant. Based on the blockchain database of this application, it can be ensured that the transaction node cannot deny provided transaction services, and therefore, interests of related nodes can be protected from aggression.

Optionally, in some embodiments of this application, if a supervision node is deployed in the blockchain system, the supervision node may own some or all data in the blockchain database. Therefore, the supervision node may further play a query role. Specifically, the supervision node obtains a query instruction, and obtains a transaction contract list in response to the query instruction, the transaction contract list being created after the transaction node requests a resource transaction from the resource providing node on the resource request node.

The supervision node performs transaction analysis on the transaction contract list. Certainly, the supervision node may also directly perform analysis based on data in the blockchain database, which is not specifically limited in this application.

The supervision node determines, in a case of determining that no transaction confirmation has been performed on a target transaction contract in the transaction list by the resource request node in the target transaction contract after the target transaction contract reaches a transaction confirmation deadline, that the target transaction contract is a false transaction.

Optionally, in some embodiments of this application, management on the transaction contract based on the blockchain database mainly includes: creation of the transaction contract, query of the transaction contract, access authorization management of the transaction contract, lifetime management of the transaction contract, execution instruction management of the transaction contract, trigger condition management of the transaction contract, and the like. The nodes may all query a new transaction contract not acquired or acquired and a historical transaction contract in the blockchain database, but out of business and privacy protection requirements for the resource request node, the resource providing node, the transaction node, and the payment node, restricted management needs to be further performed on a query permission to the transaction contract. For example, the query permission to the transaction contract can only be opened to authorized nodes participating in the resource transaction of the same transaction contract, and nodes not participating in the resource transaction are not endowed with the query permission.

That is, in the embodiments of this application, a corresponding permission needs to be further set for publicity of the transaction contract stored in the blockchain database. For example, the supervision node and the payment node can query the transaction contract in a specified transaction node or information related to the transaction contract, while the resource request node and the resource providing node can only query the transaction contract related to their own account address or the information related to the transaction contract. The supervision node and the transaction node may query real identity information of the nodes (the resource request node and/or the resource providing node) that perform the resource transaction, for example, data information, real names, banking and security data, industry information, business scopes, and business licenses.

Specifically, the supervision node endows the payment node with a restricted viewing permission, and the restricted viewing permission means that the payment node only has a permission to view transaction disclosure information in the transaction contract. The transaction disclosure information includes some information in the transaction contract. The transaction disclosure information is necessary information in a payment process. The transaction disclosure information may further include a blockchain address of the resource request node, a blockchain address of the resource providing node, transaction element information, and payment clearing document information, and signature information of the resource request node for the transaction contract. The transaction element information may include a transaction amount, product information, promotional information, logistics information, credit granting qualification, and the like. The payment clearing document information may include a payment order number, a payment time and amount, and the like. In this way, it can be ensured that the payment node checks a forged false transaction of the transaction node or whether an actual transaction is tampered with, and it can also be avoided that payment nodes in a competitive relationship steal sensitive resources of the resource request node and the resource providing node in the transaction node. Therefore, as can be learned, by using this restricted permission, it can be ensured that on the premise of checking the transaction contract by the payment node, the payment node can be further prevented from using business convenience to obtain the sensitive resources in the transaction node, thereby improving supervision power of the resource transaction to some extent, and reducing risks of the transaction contract being forged or tampered with.

Optionally, in some embodiments of this application, before paying for the transaction amount to the payment node, or after paying for the transaction amount (after the payment node acquires the order), the resource request node may further query the transaction contract by using an entry that is at a payment entry and that points to the blockchain database, and may reconcile or check the existence of a business document and a business document of the transaction node, thereby confirming and reviewing whether the transaction information of the transaction contract created by the transaction node is accurate, or reviewing whether this fund transaction behavior is accurate. In this way, rights and interests of the resource request node can be protected.

Optionally, in some embodiments of this application, transfer of the transaction payment generated in the entire transaction contract fulfillment may further be managed based on the blockchain database. Specifically, after the resource request node completes the payment transfer to the payment node, the payment node completes acquiring work of the payment agreed with the transaction contract, and the payment enters an provision account of the payment node. Because the payment is a transaction payment obtained by the resource providing node by providing a resource service on the transaction node, the ownership of the payment belongs to the resource providing node. Therefore, the transaction node has no actual control right for the payment generated by this type of transactions. After the payment node completes transaction fund acquiring, the payment node notifies the transaction node. Then, after obtaining a payment success notification fed back by the payment node, the transaction node creates a sub-account settlement contract for the resource providing node in the blockchain database. The sub-account settlement contract is a restricted contract obeying resource service terms between the resource providing node and the resource request node, and may be queried at any time by nodes participating in this resource transaction of the transaction contract.

Second, after the sub-account settlement contract is created successfully, the resource providing node may trigger execution terms on the created sub-account settlement contract by using its own account private key, to initiate a settlement request according to a to-be-settled fund in the sub-account settlement contract. First, the contract itself automatically performs checking of preconditions, for example, the resource request node makes the payment successfully, the resource request node receives the resource and is confirmed successfully on the transaction node, and the contract is effective, and may perform sub-account settlement according to the terms in the sub-account settlement contract after completing determining of all the preconditions. Alternatively, during the implementation of executing preconditions, the execution terms in the created sub-account settlement contract may be automatically triggered, to initiate the settlement request according to the to-be-settled fund in the sub-account settlement contract.

Finally, after the transaction fund of the resource providing node on the transaction node reaches a payment condition, the payment node transfers the transaction fund of the resource providing node to a settlement bank card registered during entering, and pays the fund of the provision account of the payment node to the bank of the resource providing node, to complete the actual transaction fund settlement.

Figure 3:
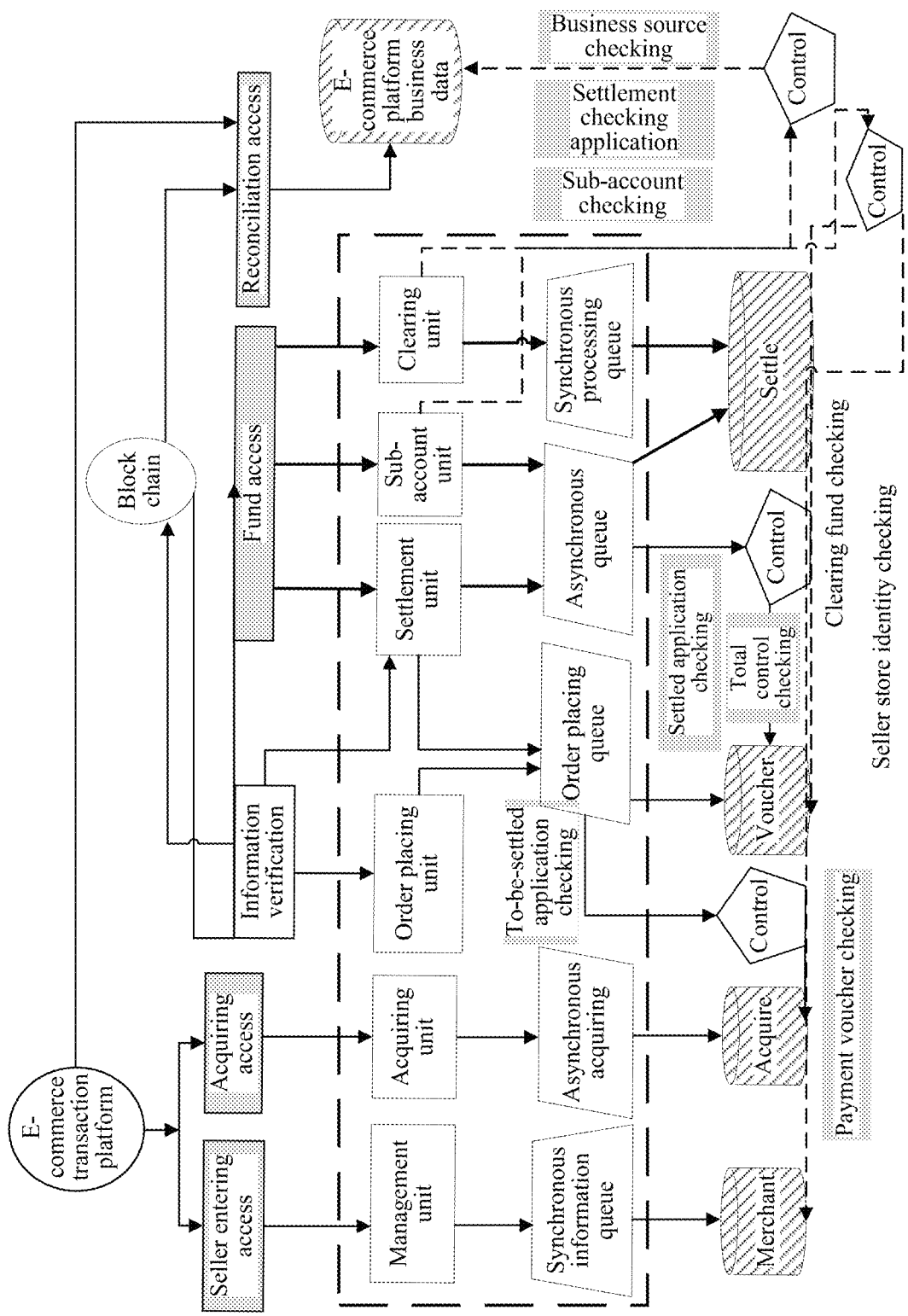
FIG. 3 is a schematic diagram of a logical division of a transaction clearing system in a blockchain system according to an embodiment of this application.

For ease of understanding, the following describes logical division about a transaction clearing system in a blockchain system shown in FIG. 3 by using an example. In this application, the resource transaction method may be performed based on the blockchain system in FIG. 3. The blockchain system may be logically divided into four layers: an access layer, a business processing layer, a storage layer, and a control layer.

The access layer includes seller access, acquiring access, fund access, and reconciliation access.

The business processing layer includes a management unit, an acquiring unit, an order placing unit, a settlement unit, a sub-account unit, a clearing unit, a synchronous information queue, asynchronous acquiring, an order placing queue, an asynchronous queue, and a synchronous processing queue. The business processing layer is a region shown by the dotted box in FIG. 3. The units in the region are responsible for completing actual business logics, including management for information about sellers and real names of sellers, information for docking work of sellers, acquiring work of orders placed by users on the e-commerce transaction platform, and reversely querying corresponding to-be-settled information uniquely associated with acquiring consistency in a blockchain.

The storage layer includes merchants, acquiring, voucher, clearing, and business data between the blockchain database and the e-commerce transaction platform, such as cylinders of the slash shadows in FIG. 3.

The control layer includes three parts. A first part is used for performing payment voucher checking and to-be-settled application checking after the e-commerce transaction platform acquires an access. A second part is used for performing total control checking and settled application checking after a fund is accessed. A third part is used for performing clearing checking application, sub-account checking, and business source checking after reconciliation is accessed. The control layer is mainly responsible for determining compliance, authenticity, and data consistency of the entire information and fund link.

The storage layer and the access layer in FIG. 3 are mainly responsible for work such as docking with the external e-commerce transaction platform and the blockchain platform, recognition of the business platform, transaction security encryption guarantee, system network management access, and the like.

Based on the architecture of the blockchain system shown in FIG. 3, the following describes a fund settlement process after a buyer completes payment. The control logic about the fund settlement process includes four parts: to-be-settled order placing admission control, settlement admission control, sub-account admission control, and clearing admission control.

The to-be-settled order placing admission control: This part of logic uses acquiring information inside the payment node as a to-be-settled order placing admission determining standard, that is, each to-be-settled transaction needs a unique associated acquired order, and an amount of a to-be-settled order needs to be consistent with the total amount in the acquired order. If the amounts are consistent, the settlement admission control part may be entered to perform an admission operation of settling the to-be-settled order. The acquiring information refers to information about an order for which the buyer pays successfully. The to-be-settled transaction refers to clearing between the payment node and the seller, the to-be-settled order describes transaction amount information that the payment node needs to transfer to the seller, and the transfer action is performed by the payment node.

The settlement admission control is mainly responsible for controlling the to-be-settled order transmitted by the e-commerce transaction platform, and the total amount of the actual settlement sub-account initiated by the to-be-settled order needs to be less than the to-be-settled order registered after the foregoing to-be-settled order placing admission control authenticates the admission.

The sub-account admission control: If there is a non-acquired to-be-settled fund (for example, promotions such as e-commerce transaction platform marketing and freight allowance, which are not counted in the acquired to-be-settled fund), the non-acquired to-be-settled fund needs to be matched with business data provided by the e-commerce transaction platform, to exclude the non-acquired to-be-settled fund from the sub-account. Meanwhile, the sub-account admission control part also needs to be responsible for a commission charge proportion category of the corresponding e-commerce transaction platform and determining of seller consistency. Specifically, the consistency determining means that the business scope is fixed for each seller, and is restricted by the business license scope applied for registration, for example: medicine, clothes, and food. Each business type is referred to as a category.

For different categories, the e-commerce transaction platform may perform different commission charge proportions. Therefore, during clearing, checking related to business data needs to be further added.

The clearing admission control: After the merchant requests to clear all to-be-settled amounts, the payment node verifies the total balance of the to-be-settled amount of the seller in the internal sub-account. The settlement request of the merchant may be admitted only after it is determined that the to-be-settled amount requested by the merchant is less than the transferable amount in the payment node. In this way, the fund settlement process is completed.

All features in the embodiments corresponding to the foregoing FIG. 1 to FIG. 3 are also suitable for embodiments corresponding to FIG. 4 to FIG. 10 in this application. The similar parts are not described again subsequently.

The foregoing describes the resource transaction method in this application, and the following describes the payment node, the transaction node, the resource request node, the resource providing node, the supervision node, and the blockchain system of the foregoing resource transaction method respectively. The payment node, the transaction node, the supervision node, the resource request node, and the resource providing node in this application may be installed in a resource transaction apparatus on a terminal device, or a terminal device installed with a resource transaction apparatus, which is not specifically limited in this application. In the embodiments of this application, the payment node, the transaction node, the supervision node, the resource request node, and the resource providing node are all based on the blockchain technology, and are mutually in a distributed topology structure. The supervision node may maintain data of the entire blockchain system, for example, blockchain account information of the resource providing node, blockchain account information of the resource request node, blockchain information of the transaction node, and information such as transaction contracts corresponding to resource transactions generated by transaction nodes.

In the embodiments of this application, the supervision node may include a blockchain database for storing data generated by the entire blockchain system, and provide access ports for the payment node, the transaction node, the resource request node, and the resource providing node, so that the payment node, the transaction node, the resource request node, and the resource providing node can enter the blockchain database to perform operations such as data query and checking. In some embodiments of this application, the blockchain database and the supervision mechanism may be further deployed separately. The specific deployment is not limited in this application.

Figure 4:
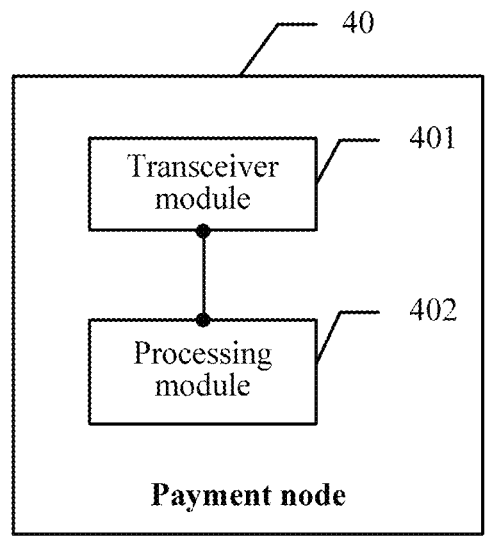
FIG. 4 is a schematic structural diagram of a payment node according to an embodiment of this application.

Referring to FIG. 4, a payment node 40 is described. The payment node is applied to a blockchain system. The blockchain system includes a blockchain database, a transaction node, at least one payment node, at least one resource providing node, and at least one resource request node. The payment node 40 includes:

a transceiver module 401, configured to obtain a transaction settlement instruction transmitted by the transaction node, the transaction settlement instruction being an instruction generated after the resource request node requests a target resource from the resource providing node on the transaction node, and after the transaction node creates a transaction contract of the target resource in the blockchain database; and a processing module 402, configured to determine that the transaction contract is an actual transaction in a case of finding the transaction contract corresponding to the transaction settlement instruction from the blockchain database according to the transaction settlement instruction, and a signature of the resource request node for this resource transaction exists in the transaction contract; and transmit a transaction payment request to the resource request node.

In this application, after the transceiver module 401 obtains a transaction settlement instruction transmitted by the transaction node, in a case of finding a transaction contract corresponding to the transaction settlement instruction from the blockchain database according to the transaction settlement instruction, and a signature of the resource request node for this resource transaction exists in the transaction contract, the processing module determines that the transaction contract is an actual transaction, and then transmits a transaction payment request to the resource request node. In this way, whether the transaction settlement instruction is forged or tampered with by the transaction node may be determined, to avoid risks of paying for false transactions.

Optionally, in some embodiments of this application, the processing module 402 is further configured to:

determine that the transaction contract is a false transaction in a case of not finding the transaction contract corresponding to the transaction settlement instruction from the blockchain database according to the transaction settlement instruction, or finding the transaction contract corresponding to the transaction settlement instruction from the blockchain database, but no signature of the resource request node for this resource transaction exists in the transaction contract, and transmit a transaction payment rejection response to the transaction node by using the transceiver module 401.

Optionally, in some embodiments of this application, the transaction contract includes transaction information of a transaction, and may further include a trigger condition of a plurality of transaction operations, and operation instructions of transaction operations that correspond to the transaction contract and that are performed by the transaction node, the payment node, the resource providing node, and the resource request node within a lifetime of the transaction contract. The transaction information may include all information related to the transaction such as related information of participators of the transaction and transaction state information. For example, the transaction information includes a blockchain address of the resource request node, and a blockchain address of the resource providing node, transaction element information, payment clearing document information, and the like. The processing module is further configured to:

query a currently performed transaction operation in the transaction contract in a case that the resource request node confirms that this resource transaction is completed in the transaction contract, or the payment node determines that the transaction contract reaches a transaction confirmation deadline, and perform, according to the currently performed transaction operation in the transaction contract, a next transaction operation that meets the trigger condition in the transaction contract.

The transaction operation includes payment transfer, and resource receipt and notification. The payment transfer refers to transferring a resource payment requested by a payment of the resource request node to the resource providing node. The notification is used for notifying the resource request node and the resource providing node of the current transaction state of the transaction contract.

Optionally, in some embodiments of this application, the payment node has a restricted viewing permission, and the restricted viewing permission means that the payment node only has a permission to view transaction disclosure information in the transaction contract. The transaction disclosure information includes some information in the transaction contract. The transaction disclosure information is necessary information in a payment process. The transaction disclosure information may further include a blockchain address of the resource request node, a blockchain address of the resource providing node, transaction element information, and payment clearing document information, and signature information of the resource request node for the transaction contract.

Optionally, in some embodiments of this application, the processing module 402 is specifically configured to:

query the transaction disclosure information this resource transaction from the transaction contract after finding the transaction contract from the blockchain database according to the transaction settlement instruction; and determine that the transaction contract is an actual transaction if determining, according to the transaction disclosure information, that the resource request node signs the transaction contract for this resource transaction.

Figure 5:
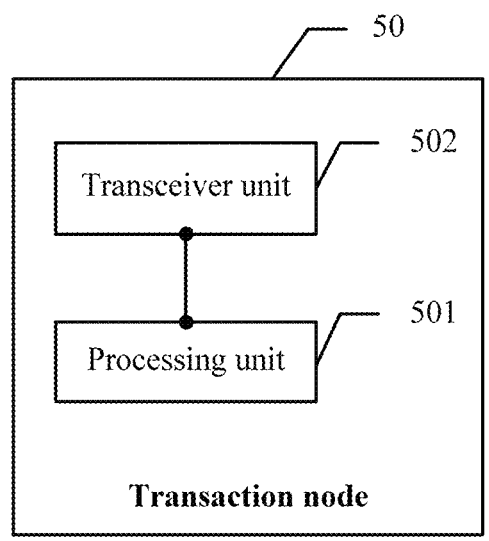
FIG. 5 is a schematic structural diagram of a transaction node according to an embodiment of this application.

Referring to FIG. 5, a transaction node 50 is described. The transaction node is applied to a blockchain system. The blockchain system includes a blockchain database, a transaction node, at least one payment node, at least one resource providing node, and at least one resource request node. The transaction node 50 includes:

a processing unit 501, configured to create a transaction contract in the blockchain database after the resource request node requests a resource from the resource providing node on the transaction node; and a transceiver unit 502, configured to transmit a transaction settlement instruction corresponding to the transaction contract to the payment node, so that the payment node determines that the transaction contract is an actual transaction after finding the transaction contract corresponding to the transaction settlement instruction from the blockchain database according to the transaction settlement instruction, and a signature of the resource request node for this resource transaction exists in the transaction contract, and transmits a transaction payment request to the resource request node.

In the embodiments of this application, the transaction node is based on a blockchain. The blockchain database creates a transaction contract, so that the payment node receiving a transaction settlement instruction can find the transaction contract corresponding to the transaction settlement instruction from the blockchain database according to the transaction settlement instruction, determines that the transaction contract is an actual transaction when a signature of the resource request node for this resource transaction exists in the transaction contract, and then transmits a transaction payment request to the resource request node. In this way, whether the transaction settlement instruction is forged or tampered with by the transaction node may be determined, to avoid risks of paying for false transactions.

Optionally, in some embodiments of this application, the processing unit 502 is further configured to:

create a sub-account settlement contract the supervision node after the transceiver unit 502 receives a confirmation response that is transmitted by the payment node and that indicates that the payment of the transaction contract is successful, so that the resource providing node, the resource request node, and the payment node query this resource transaction.

Figure 6:
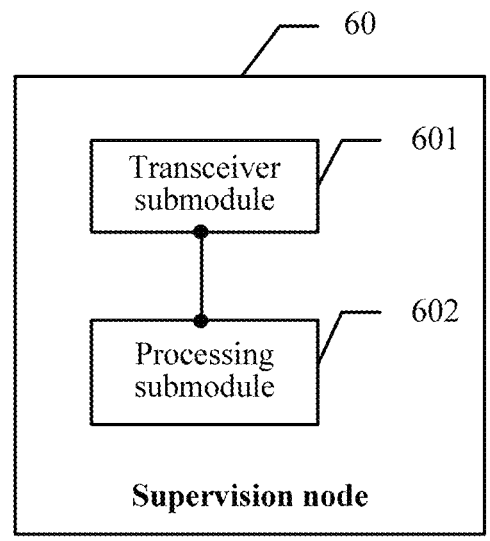
FIG. 6 is a schematic structural diagram of a supervision node according to an embodiment of this application.

Referring to FIG. 6, a supervision node 60 is described. The supervision node is applied to a blockchain system. The blockchain system includes a blockchain database, a transaction node, at least one payment node, at least one resource providing node, at least one resource request node, and the supervision node. The supervision node 60 includes:

a transceiver submodule 601, configured to obtain a query instruction, and obtain a transaction contract list in response to the query instruction, the transaction contract list being created after the transaction node requests a resource transaction from the resource providing node on the resource request node; and a processing submodule 602, configured to perform transaction analysis on at least one transaction contract in the transaction contract list, where in a case of determining that no transaction confirmation has been performed on a target transaction contract in the transaction list by the resource request node in the target transaction contract after the target transaction contract reaches a transaction confirmation deadline, the supervision node determines that the target transaction contract is a false transaction.

In the embodiments of this application, the supervision node may check the generated transaction contract at any time.

Optionally, in some embodiments of this application, the processing submodule 602 is further configured to:

endow the payment node with a restricted viewing permission, and the restricted viewing permission means that the payment node only has a permission to view transaction disclosure information in the transaction contract.

The transaction disclosure information includes some information in the transaction contract. The transaction disclosure information is necessary information in a payment process. The transaction disclosure information may further include a blockchain address of the resource request node, a blockchain address of the resource providing node, transaction element information, and payment clearing document information, and signature information of the resource request node for the transaction contract.

Figure 7:
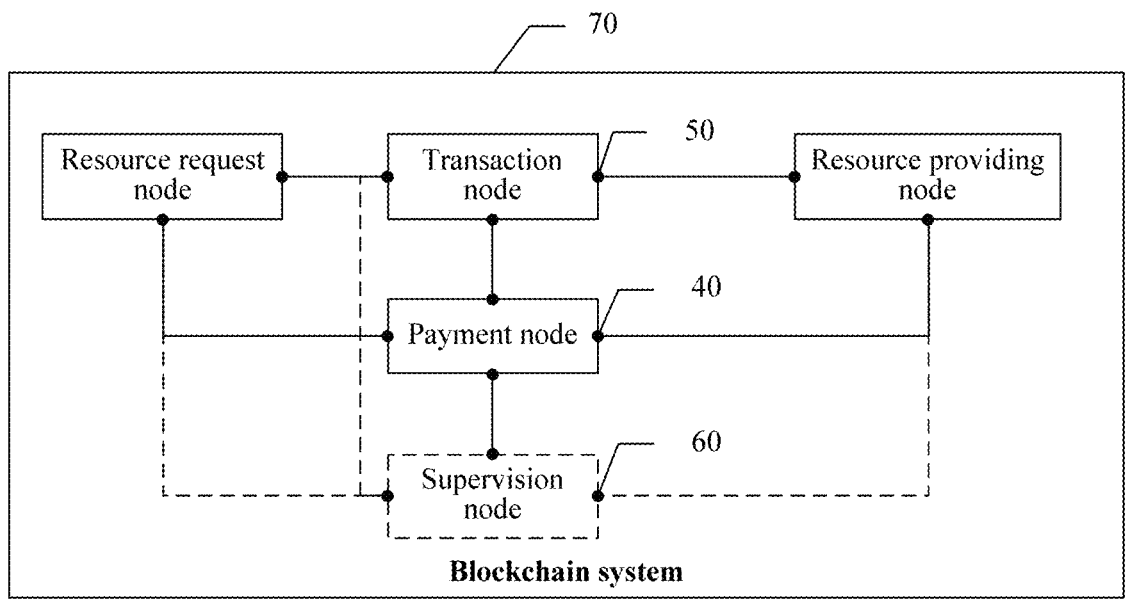
FIG. 7 is a schematic structural diagram of a blockchain system according to an embodiment of this application.

Referring to FIG. 7, a blockchain system 70 is described. The blockchain system 70 includes a blockchain database, at least one payment node shown in FIG. 4, at least one transaction node 50 shown in FIG. 5, at least one resource providing node, and at least one resource request node. Optionally, the blockchain system may further include a supervision node 60 shown in FIG. 6.

The resource request node is configured to request a target resource from the resource providing node by using the transaction node 50.

The transaction node 50 is configured to create a transaction contract of the target resource based on the blockchain database.

The payment node 40 is configured to obtain a transaction settlement instruction, and determine that the transaction contract is an actual transaction in a case of finding the transaction contract corresponding to the transaction settlement instruction from the blockchain database according to the transaction settlement instruction, and a signature of the resource request node for this resource transaction exists in the transaction contract; and transmit a transaction payment request to the resource request node.

The blockchain system in this application is a distributed system. The transaction node, the payment node, the supervision node, the resource request node, and the resource providing node may be apparatuses in logical division, and may be independent terminal devices respectively, which are not specifically limited in this application.

The payment node, the transaction node, and the supervision node in the embodiments of this application are described above respectively from the perspective of modularized or unitized functional entities. The resource transaction node in the embodiments of this application is described below from the perspective of hardware processing. An embodiment of this application further provides a resource transaction apparatus (as the structure shown in FIG. 8), including at least one connected processor, memory, and transceiver. The memory is configured to store program code, and the processor is configured to invoke the program code in the memory to perform some or all steps in the foregoing resource transaction method performed by the payment node or the transaction node or the supervision node in the foregoing embodiments.

Figure 8:
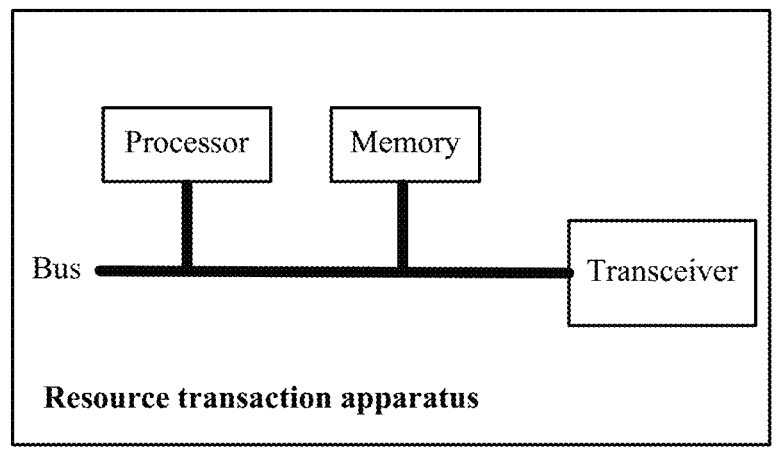
FIG. 8 is a schematic structural diagram of a resource transaction apparatus according to an embodiment of this application.

In some embodiments of this application, the apparatus shown in FIG. 8 may be configured to implement the function of the payment node in this application, and can perform all operations performed by the payment node or the payment terminal device in the embodiments of this application. The processor in FIG. 8 may be configured to perform the following operations:

obtaining, by using the transceiver, a transaction settlement instruction transmitted by the transaction node, the transaction settlement instruction being an instruction generated after the resource request node requests a target resource from the resource providing node on the transaction node, and after the transaction node creates a transaction contract of the target resource in the blockchain database;

determining that the transaction contract is an actual transaction in a case of finding the transaction contract corresponding to the transaction settlement instruction from the blockchain database according to the transaction settlement instruction, and a signature of the resource request node for this resource transaction exists in the transaction contract; and transmitting a transaction payment request to the resource request node by using the transceiver.

In some embodiments of this application, the apparatus shown in FIG. 8 may be configured to implement the function of the transaction node in this application, and can perform all operations performed by the transaction node or the transaction terminal device in the embodiments of this application. The processor in FIG. 8 may be configured to perform the following operations:

creating a transaction contract in the blockchain database after the resource request node requests a resource from the resource providing node on the transaction node; and transmitting a transaction settlement instruction corresponding to the transaction contract to the payment node by using the transceiver, so that the payment node determines that the transaction contract is an actual transaction after finding the transaction contract corresponding to the transaction settlement instruction from the blockchain database according to the transaction settlement instruction, and a signature of the resource request node for this resource transaction exists in the transaction contract, and transmits a transaction payment request to the resource request node.

In some embodiments of this application, the apparatus shown in FIG. 8 may be configured to implement the function of the supervision node in this application, and can perform all operations performed by the supervision node or the supervision terminal device in the embodiments of this application. The processor in FIG. 8 may be configured to perform the following operations:

obtaining a query instruction by using the transceiver, and obtaining a transaction contract list in response to the query instruction, the transaction contract list being created after the transaction node requests a resource transaction from the resource providing node on the resource request node;

performing transaction analysis on at least one transaction contract in the transaction contract list; and determining, in a case of determining that no transaction confirmation has been performed on a target transaction contract in the transaction list by the resource request node in the target transaction contract after the target transaction contract reaches a transaction confirmation deadline, that the target transaction contract is a false transaction.

An entity device corresponding to the transceiver module, the transceiver unit, and the transceiver submodule in the embodiments of this application (including the embodiments shown in FIG. 4, FIG. 5, and FIG. 6) may be a transceiver, and an entity device corresponding to the processing module, the processing unit, and the processing submodule may be a processor. The apparatuses shown in FIG. 4, FIG. 5, and FIG. 6 may all have the structure shown in FIG. 8. When one of the apparatuses has the structure shown in FIG. 8, the processor and the transceiver in FIG. 8 implement the functions provided in the foregoing apparatus embodiment corresponding to the apparatus, and the memory in FIG. 8 stores program code that needs to be invoked when the processor performs the foregoing resource transaction method.

Figure 9:
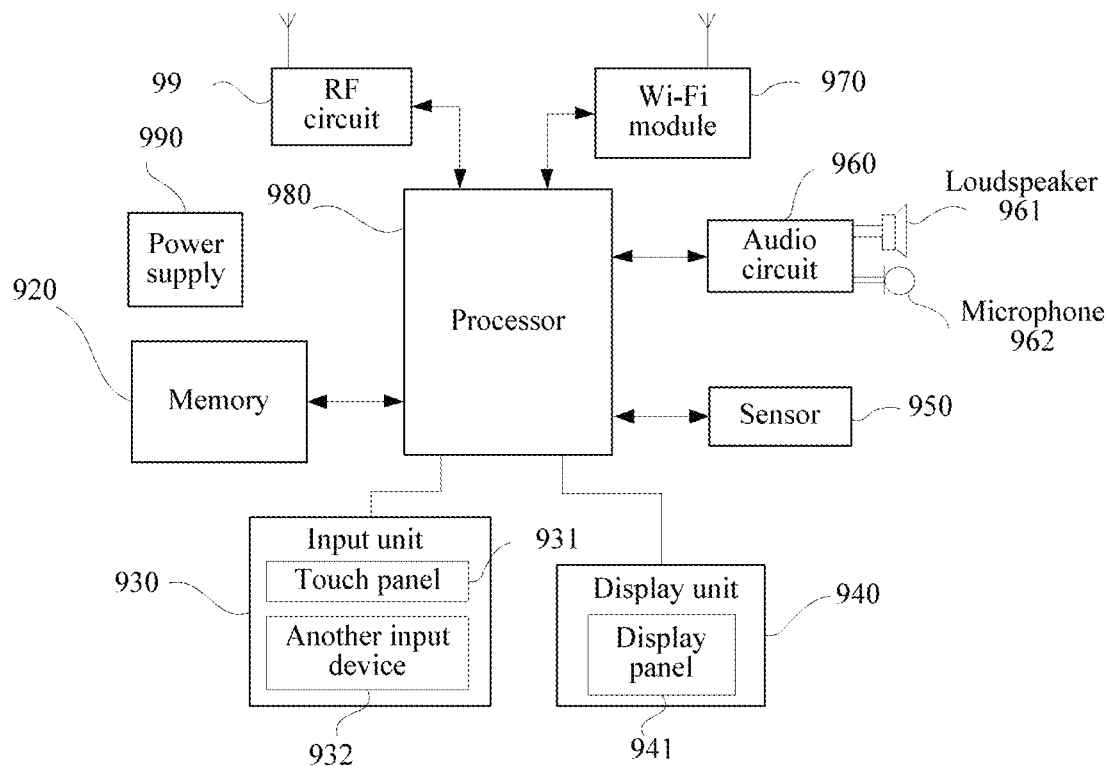
FIG. 9 is a schematic structural diagram of a terminal device according to an embodiment of this application.

An embodiment of this application further provides another terminal device. The terminal device may implement the function of the payment node in this application, and can perform all operations performed by the payment node or the payment terminal device in the embodiments of this application, or may implement the function of the transaction node in this application, and can perform all operations performed by the transaction node or the transaction terminal device in the embodiments of this application, or may implement the function of the supervision node in this application, and can perform all operations performed by the supervision node or the supervision terminal device in the embodiments of this application. For ease of description, FIG. 9 shows only a part related to this embodiment of this application. For specific technical details not disclosed, refer to the method part in the embodiments of this application. The terminal device may be any terminal device such as a mobile phone, a tablet computer, a personal digital assistant (PDA), a Point of Sales (POS), or an in-vehicle computer. The terminal being a mobile phone is used as an example.

FIG. 9 is a block diagram of a structure of a part of a mobile phone related to a terminal device according to an embodiment of this application. Referring to FIG. 9, the mobile phone includes components such as a radio frequency (RF) circuit 99, a memory 920, an input unit 930, a display unit 940, a sensor 950, an audio circuit 960, a wireless fidelity (Wi-Fi) module 970, a processor 980, and a power supply 990. A person skilled in the art may understand that the structure of the mobile phone shown in FIG. 9 does not constitute a limitation to the mobile phone, and the mobile phone may include more components or fewer components than those shown in the figure, or some components may be combined, or a different component deployment may be used.

The following specifically describes the components of the mobile phone with reference to FIG. 9.

The RF circuit 99 may be configured to receive and transmit signals during an information receiving and transmitting process or a call process. Specifically, the RF circuit 99 receives downlink information from a base station, then delivers the downlink information to the processor 980 for processing, and transmits related uplink data to the base station. Generally, the RF circuit 99 includes, but is not limited to, an antenna, at least one amplifier, a transceiver, a coupler, a low noise amplifier (LNA), and a duplexer. In addition, the RF circuit 99 may also communicate with a network and another device through wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 920 may be configured to store a software program and module. The processor 980 runs the software program and module stored in the memory 920, to implement various functional applications and data processing of the mobile phone. The memory 920 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 920 may include a high-speed random access memory, and may further include a non-volatile memory such as at least one magnetic disk storage device or a flash memory device, or another volatile solid storage device.

The input unit 930 may be configured to receive input digit or character information, and generate a keyboard signal input related to the user setting and function control of the mobile phone. Specifically, the input unit 930 may include a touch panel 931 and another input device 932. The touch panel 931, which may also be referred to as a touch screen, may collect a touch operation of a user on or near the touch panel (such as an operation of a user on or near the touch panel 931 by using any suitable object or accessory such as a finger or a stylus), and drive a corresponding connection apparatus according to a preset program. Optionally, the touch panel 931 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 980. In addition, the touch controller can receive a command transmitted by the processor 980 and execute the command. In addition, the touch panel 931 may be a resistive, capacitive, infrared, or surface sound wave type touch panel. In addition to the touch panel 931, the input unit 930 may further include the another input device 932. Specifically, the another input device 932 may include, but is not limited to, one or more of a physical keyboard, a functional key (such as a volume control key or a switch key), a track ball, a mouse, and a joystick.

The display unit 940 may be configured to display information inputted by the user or information provided for the user, and various menus of the mobile phone. The display unit 940 may include a display panel 941. Optionally, the display panel 941 may be configured by using a liquid crystal display (LCD), an organic light-emitting diode (OLED), or the like. Further, the touch panel 931 may cover the display panel 941. After detecting a touch operation on or near the touch panel 931, the touch panel 941 transfers the touch operation to the processor 980, to determine a type of a touch event. Then, the processor 980 provides a corresponding visual output on the display panel 941 according to the type of the touch event. Although, in FIG. 9, the touch panel 931 and the display panel 941 are used as two separate parts to implement input and output functions of the mobile phone, in some embodiments, the touch panel 931 and the display panel 941 may be integrated to implement the input and output functions of the mobile phone.

The mobile phone may further include at least one sensor 950 such as an optical sensor, a motion sensor, and other sensors. Specifically, the optical sensor may include an ambient light sensor and a proximity sensor. The ambient light sensor may adjust luminance of the display panel 941 according to brightness of the ambient light. The proximity sensor may switch off the display panel 941 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 960, a loudspeaker 961, and a microphone 962 may provide audio interfaces between the user and the mobile phone. The audio circuit 960 may convert received audio data into an electric signal and transmit the electric signal to the loudspeaker 961. The loudspeaker 961 converts the electric signal into a sound signal for output. On the other hand, the microphone 962 converts a collected sound signal into an electric signal. The audio circuit 960 receives the electric signal and converts the electric signal into audio data, and outputs the audio data to the processor 980 for processing. Then, the processor 980 transmits the audio data to, for example, another mobile phone by using the RF circuit 99, or outputs the audio data to the memory 920 for further processing.

Wi-Fi is a short distance wireless transmission technology. The mobile phone may help, by using the Wi-Fi module 970, the user to receive and transmit e-mails, browse a web page, access streaming media, and so on, which provides wireless broadband Internet access for the user. Although FIG. 9 shows the Wi-Fi module 970, it may be understood that the Wi-Fi module 970 is not a necessary component of the mobile phone, and when required, the Wi-Fi module 970 may be omitted as long as the scope of the essence of this application is not changed.

The processor 980 is the control center of the mobile phone, and is connected to various parts of the mobile phone by using various interfaces and lines. By running or executing the software program and/or module stored in the memory 920, and invoking data stored in the memory 920, the processor 980 performs various functions and data processing of the mobile phone, thereby performing overall monitoring on the mobile phone. Optionally, the processor 980 may include one or more processing units. Optionally, the processor 980 may integrate an application processor and a modem processor. The application processor mainly processes an operating system, a user interface, an application program, and the like. The modem processor mainly processes wireless communication. It may be understood that the foregoing modem processor may alternatively not be integrated into the processor 980.

The mobile phone further includes the power supply 990 (such as a battery) for supplying power to the components. Optionally, the power supply may be logically connected to the processor 980 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of this application, the processor 980 included in the mobile phone further has a function of controlling to perform the processes of the foregoing resource transaction methods performed by the payment node or the transaction node or the supervision node, the resource request node, and the resource providing node. The mobile phone may serve as the payment node or the transaction node or the supervision node.

For example, when the terminal device shown in FIG. 9 is configured to implement the function of the payment node in the embodiments of this application, the processor 980 in FIG. 9 may be configured to perform the following operations:

obtaining, by using the input unit 930, a transaction settlement instruction transmitted by the transaction node, the transaction settlement instruction being an instruction generated after the resource request node requests a target resource from the resource providing node on the transaction node, and after the transaction node creates a transaction contract of the target resource in the blockchain database;

determining that the transaction contract is an actual transaction in a case of finding the transaction contract corresponding to the transaction settlement instruction from the blockchain database according to the transaction settlement instruction, and a signature of the resource request node for this resource transaction exists in the transaction contract; and transmitting a transaction payment request to the resource request node through the RF circuit 99.

For another example, when the terminal device shown in FIG. 9 is configured to implement the function of the transaction node in the embodiments of this application, the processor 980 in FIG. 9 may be configured to perform the following operations:

creating a transaction contract in the blockchain database after the resource request node requests a resource from the resource providing node on the transaction node; and transmitting a transaction settlement instruction corresponding to the transaction contract to the payment node through the RF circuit 99, so that the payment node determines that the transaction contract is an actual transaction after finding the transaction contract corresponding to the transaction settlement instruction from the blockchain database according to the transaction settlement instruction, and a signature of the resource request node for this resource transaction exists in the transaction contract, and transmits a transaction payment request to the resource request node.

For another example, when the terminal device shown in FIG. 9 is configured to implement the function of the supervision node in the embodiments of this application, the processor 980 in FIG. 9 may be configured to perform the following operations:

obtaining a query instruction by using the input unit 930, and obtaining a transaction contract list in response to the query instruction, the transaction contract list being created after the transaction node requests a resource transaction from the resource providing node on the resource request node;

performing transaction analysis on at least one transaction contract in the transaction contract list; and determining, in a case of determining that no transaction confirmation has been performed on a target transaction contract in the transaction list by the resource request node in the target transaction contract after the target transaction contract reaches a transaction confirmation deadline, that the target transaction contract is a false transaction.

Figure 10:
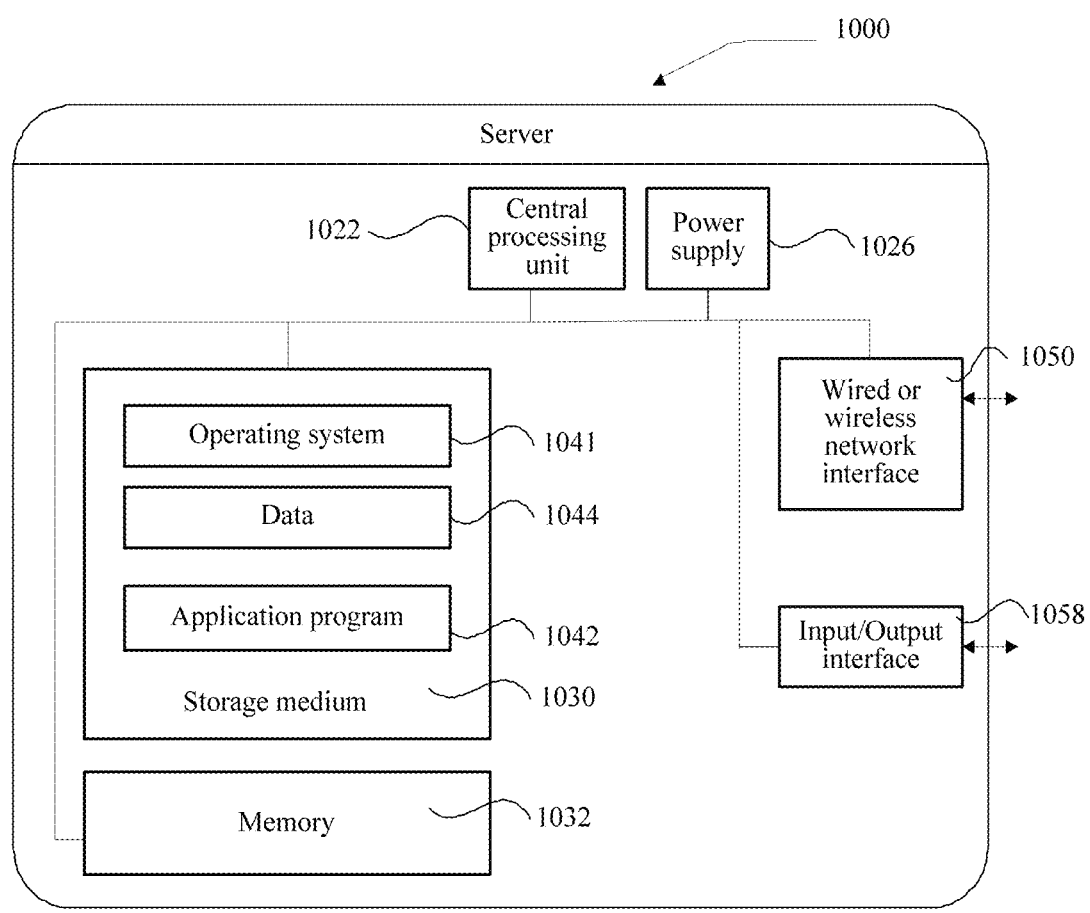
FIG. 10 is a schematic structural diagram of a server according to an embodiment of this application.

FIG. 10 is a schematic structural diagram of a server according to an embodiment of this application. The server 1000 may vary greatly due to different configurations or performance, and may include one or more central processing units (CPU) 1022 (for example, one or more processors) and a memory 1032, and one or more storage media 1030 (for example, one or more mass storage devices) that store an application program 1042 or data 1044. The memory 1032 and the storage medium 1030 may be transient storages or persistent storages. The program stored in the storage medium 1030 may include one or more modules (which is not marked in the figure), and each module may include a series of instruction and operations to the server. Still further, the CPU 1022 may be configured to communicate with the storage medium 1030, and perform, on the server 1000, a series of instructions and operations in the storage medium 1030.

The server 1000 may further include one or more power supplies 1026, one or more wired or wireless network interfaces 1050, one or more input/output interfaces 1058, and/or one or more operating systems 1041, for example, Windows Server, Mac OS X, Unix, Linux, and FreeBSD.

In the foregoing embodiments, the steps performed by the payment node or the transaction node or the supervision node, the resource request node, and the resource providing node may be based on the server structure shown in FIG. 10.

For example, when the server shown in FIG. 10 is configured to implement the function of the payment node in the embodiments of this application, the CPU 1022 in FIG. 10 may be configured to perform the following operations:

obtaining, through the input/output interface 1058, a transaction settlement instruction transmitted by the transaction node, the transaction settlement instruction being an instruction generated after the resource request node requests a target resource from the resource providing node on the transaction node, and after the transaction node creates a transaction contract of the target resource in the blockchain database; and determining that the transaction contract is an actual transaction in a case of finding the transaction contract corresponding to the transaction settlement instruction from the blockchain database according to the transaction settlement instruction, and a signature of the resource request node for this resource transaction exists in the transaction contract, and transmitting a transaction payment request to the resource request node through the wired or wireless network interface 1050.

For another example, when the server shown in FIG. 10 is configured to implement the function of the transaction node in the embodiments of this application, the CPU 1022 in FIG. 10 may be configured to perform the following operations:

creating a transaction contract in the blockchain database after the resource request node requests a resource from the resource providing node on the transaction node; and transmitting a transaction settlement instruction corresponding to the transaction contract to the payment node through the wired or wireless network interface 1050, so that the payment node determines that the transaction contract is an actual transaction after finding the transaction contract corresponding to the transaction settlement instruction from the blockchain database according to the transaction settlement instruction, and a signature of the resource request node for this resource transaction exists in the transaction contract, and transmits a transaction payment request to the resource request node.

For another example, when the server shown in FIG. 10 is configured to implement the function of the supervision node in the embodiments of this application, the CPU 1022 in FIG. 10 may be configured to perform the following operations:

obtaining a query instruction through the input/output interface 1058, and obtaining a transaction contract list in response to the query instruction, the transaction contract list being created after the transaction node requests a resource transaction from the resource providing node on the resource request node;

performing transaction analysis on at least one transaction contract in the transaction contract list; and determining, in a case of determining that no transaction confirmation has been performed on a target transaction contract in the transaction list by the resource request node in the target transaction contract after the target transaction contract reaches a transaction confirmation deadline, that the target transaction contract is a false transaction.

An embodiment of this application further provides a computer storage medium. The medium stores a program, and the program performs some or all steps in the foregoing resource transaction method performed by the foregoing payment node or transaction node or supervision node or resource request node or resource providing node.

In the foregoing embodiments, the description of each embodiment has respective focuses. For a part that is not described in detail in an embodiment, refer to related descriptions in other embodiments.

It may be clearly understood by a person skilled in the art that for convenience and brevity of description, for a detailed working process of the foregoing system, apparatus, and module, reference may be made to a corresponding process in the foregoing method embodiments, and details are not described herein again.

In the several embodiments provided in this application, it is to be understood that the disclosed system, apparatus, and method may be implemented in other manners. For example, the described apparatus embodiments are merely examples. For example, division of the modules is merely logical function division and may be other division manners during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all modules thereof may be selected based on an actual requirement, to implement an objective of the solution in this embodiment.

In addition, functional modules or units in the embodiments of the present application may be integrated into one processing module or unit, or each of the modules or units may exist alone physically, or two or more modules or units may be integrated into one module or unit. The integrated module may be implemented in a form of hardware, or may be implemented in a form of a software functional module. When the integrated module is implemented in the form of a software functional module and sold or used as an independent product, the integrated module may be stored in a computer-readable storage medium.

All or some of the foregoing embodiments may be implemented through software, hardware, firmware, or any combination thereof. When the embodiments are implemented by using software, all or some of the embodiments may be implemented in a form of a computer program product.

The computer program product includes one or more computer instructions. When the computer program instructions are loaded and executed on a computer, all or some of the processes or functions according to the embodiments of this application are produced. The computer may be a general-purpose computer, a special-purpose computer, a computer network, or another programmable apparatus. The computer instructions may be stored in a computer readable storage medium or may be transmitted from a computer readable storage medium to another computer readable storage medium. For example, the computer instructions may be transmitted from a website, a computer, a server, or a data center to another website, computer, server, or data center in a wired (such as a coaxial cable, a fiber, or a digital subscriber line (DSL)) or wireless (such as infrared, radio, or microwave) manner. The computer readable storage medium may be any available medium capable of being stored by a computer or include one or more data storage devices integrated by an available medium, such as a server and a data center. The available medium may be a magnetic medium (such as a floppy disk, a hard disk, or a magnetic tape), an optical medium (such as a DVD), a semiconductor medium (such as a solid state disk (SSD)) or the like.

The technical solutions of provided in this application are described above in detail. Although the principles and implementations of this application are described by using specific examples in this application, the descriptions of the foregoing embodiments are merely intended to help understand the method and the core idea of the method of this application. Meanwhile, a person of ordinary skill in the art may make modifications to the specific implementations and application range according to the idea of this application. In conclusion, the content of this specification are not to be construed as a limit on this application.

What is claimed is:

1. A resource transaction method performed at a blockchain system, the blockchain system comprising a blockchain distributed across a blockchain database, a transaction node, at least one payment node, at least one resource providing node, and at least one resource request node, and the method comprising:

in accordance with a purchase request from a buyer, requesting, by the resource request node, a target resource from the resource providing node by using the transaction node;

creating, by the transaction node, a transaction contract for the target resource based on the blockchain database, the transaction contract including a blockchain identifier for the resource request node, a blockchain identifier for the resource providing node, a signature of the resource request node, and information regarding the target resource, wherein the signature of the resource request node is generated using a private key of the resource request node;

adding the transaction contract to the blockchain and transmitting, by the transaction node, the transaction contract to the blockchain database for storage;

obtaining, by the payment node, a transaction settlement instruction including transaction contract information;

authenticating, by the payment node, the transaction settlement instruction, including:
finding the transaction contract corresponding to the transaction settlement instruction in the blockchain database based on the transaction contract information; and
verifying the signature of the resource request node exists in the transaction contract, including using a public key of the resource request node to verify the signature; and transmitting, by the payment node, a transaction payment request to the resource request node in accordance with authentication of the transaction settlement instruction.

2. The method according to claim 1, wherein the method further comprises:
- determining, by the payment node, that a second transaction settlement instruction is invalid in accordance with:
  - (i) not finding a second transaction contract corresponding to the second transaction settlement instruction in the blockchain database based on transaction contract information in the second transaction settlement instruction; or
  - (ii) finding the second transaction contract corresponding to the second transaction settlement instruction and determining that the signature of the resource request node does not exist in the second transaction contract; and
- transmitting a transaction payment rejection response to the transaction node in accordance with determining that the second transaction settlement instruction is invalid.

3. The method according to claim 1, wherein the transaction contract comprises a trigger condition of a plurality of transaction operations, and operation instructions of transaction operations that correspond to the transaction contract and that are performed by the transaction node, the payment node, the resource providing node, and the resource request node within a lifetime of the transaction contract, and the method further comprises:
- querying, by the payment node, a currently performed transaction operation in the transaction contract in a case that (i) the resource request node confirms that this resource transaction is completed in the transaction contract, or (ii) the payment node determines that the transaction contract reaches a transaction confirmation deadline; and
- performing, according to the currently performed transaction operation in the transaction contract, a next transaction operation that meets the trigger condition in the transaction contract.

4. The method according to claim 1, wherein the payment node has a restricted viewing permission for the transaction contract, the restricted viewing permission giving the payment node permission to view only a subset of information in the transaction contract.

5. The method according to claim 1, wherein the transaction settlement instruction is generated after the transaction node transmits the transaction contract to the blockchain database.

6. A blockchain system, comprising a blockchain database, a transaction node, at least one payment node, at least one resource providing node, and at least one resource request node, and wherein the blockchain system is configured to perform a plurality of operations including:
- in accordance with a purchase request from a buyer, requesting, by the resource request node, a target resource from the resource providing node by using the transaction node;
- creating, by the transaction node, a transaction contract for the target resource based on the blockchain database, the transaction contract including a blockchain identifier for the resource request node, a blockchain identifier for the resource providing node, a signature of the resource request node, and information regarding the target resource, wherein the signature of the resource request node is generated using a private key of the resource request node;
- adding the transaction contract to the blockchain and transmitting, by the transaction node, the transaction contract to the blockchain database for storage;
- obtaining, by the payment node, a transaction settlement instruction including transaction contract information;
- authenticating, by the payment node, the transaction settlement instruction, including:
  - finding the transaction contract corresponding to the transaction settlement instruction in the blockchain database based on the transaction contract information; and
  - verifying the signature of the resource request node exists in the transaction contract, including using a public key of the resource request node to verify the signature; and
- transmitting, by the payment node, a transaction payment request to the resource request node in accordance with authentication of the transaction settlement instruction.

7. The blockchain system according to claim 6, wherein the plurality of operations further comprise:
- determining, by the payment node, that a second transaction settlement instruction is invalid in accordance with:
  - (i) not finding a second transaction contract corresponding to the second transaction settlement instruction in the blockchain database based on transaction contract information in the second transaction settlement instruction; or
  - (ii) finding the second transaction contract corresponding to the second transaction settlement instruction and determining that the signature of the resource request node does not exist in the second transaction contract; and
- transmitting a transaction payment rejection response to the transaction node in accordance with determining that the second transaction settlement instruction is invalid.

8. The blockchain system according to claim 6, wherein the transaction contract comprises a trigger condition of a plurality of transaction operations, and operation instructions of transaction operations that correspond to the transaction contract and that are performed by the transaction node, the payment node, the resource providing node, and the resource request node within a lifetime of the transaction contract, and the plurality of operations further comprise:
- querying, by the payment node, a currently performed transaction operation in the transaction contract in a case that (i) the resource request node confirms that this resource transaction is completed in the transaction contract, or (ii) the payment node determines that the transaction contract reaches a transaction confirmation deadline; and
- performing, according to the currently performed transaction operation in the transaction contract, a next transaction operation that meets the trigger condition in the transaction contract.

9. The blockchain system according to claim 6, wherein the payment node has a restricted viewing permission for the transaction contract, the restricted viewing permission giving the payment node permission to view only a subset of information in the transaction contract.

10. The blockchain system according to claim 6, wherein the transaction settlement instruction is generated after the transaction node transmits the transaction contract to the blockchain database.

11. A non-transitory computer readable storage medium storing a plurality of machine readable instructions in connection with a blockchain system having a blockchain database, a transaction node, at least one payment node, at least one resource providing node, and at least one resource request node, wherein the plurality of machine readable instructions, when executed by the blockchain system, cause the blockchain system to perform a plurality of operations including:

in accordance with a purchase request from a buyer, requesting, by the resource request node, a target resource from the resource providing node by using the transaction node;

creating, by the transaction node, a transaction contract for the target resource based on the blockchain database, the transaction contract including a blockchain identifier for the resource request node, a blockchain identifier for the resource providing node, a signature of the resource request node, and information regarding the target resource, wherein the signature of the resource request node is generated using a private key of the resource request node;

adding the transaction contract to the blockchain and transmitting, by the transaction node, the transaction contract to the blockchain database for storage;

obtaining, by the payment node, a transaction settlement instruction including transaction contract information;

authenticating, by the payment node, the transaction settlement instruction, including:

finding the transaction contract corresponding to the transaction settlement instruction in the blockchain database based on the transaction contract information; and verifying the signature of the resource request node exists in the transaction contract, including using a public key of the resource request node to verify the signature; and transmitting, by the payment node, a transaction payment request to the resource request node in accordance with authentication of the transaction settlement instruction.

12. The non-transitory computer readable storage medium according to claim 11, wherein the plurality of operations further comprise:

determining, by the payment node, that a second transaction settlement instruction is invalid in accordance with:

(i) not finding a second transaction contract corresponding to the second transaction settlement instruction in the blockchain database based on transaction contract information in the second transaction settlement instruction; or (ii) finding the second transaction contract corresponding to the second transaction settlement instruction and determining that the signature of the resource request node does not exist in the second transaction contract; and transmitting a transaction payment rejection response to the transaction node in accordance with determining that the second transaction settlement instruction is invalid.

13. The non-transitory computer readable storage medium according to claim 11, wherein the transaction contract comprises a trigger condition of a plurality of transaction operations, and operation instructions of transaction operations that correspond to the transaction contract and that are performed by the transaction node, the payment node, the resource providing node, and the resource request node within a lifetime of the transaction contract, and the plurality of operations further comprise:

querying, by the payment node, a currently performed transaction operation in the transaction contract in a case that (i) the resource request node confirms that this resource transaction is completed in the transaction contract, or (ii) the payment node determines that the transaction contract reaches a transaction confirmation deadline; and performing, according to the currently performed transaction operation in the transaction contract, a next transaction operation that meets the trigger condition in the transaction contract.

14. The non-transitory computer readable storage medium according to claim 11, wherein the payment node has a restricted viewing permission for the transaction contract, the restricted viewing permission giving the payment node permission to view only a subset of information in the transaction contract.

15. The non-transitory computer readable storage medium according to claim 11, wherein the transaction settlement instruction is generated after the transaction node transmits the transaction contract to the blockchain database.

16. The method according to claim 1, wherein the transaction contract further includes a transaction amount, product information corresponding to the target resource, and payment clearing document information.

17. The method according to claim 1, wherein the resource request node is a component of an electronic device of the buyer, the resource providing node is a component of an electronic device of a seller, the transaction node is a component of an e-commerce platform, and the payment node is a component of a payment platform.

18. The method according to claim 1, further comprising, at the resource request node:

receiving the transaction payment request; and submitting payment to the payment node in response to the transaction payment request.

19. The method according to claim 1, further comprising registering the resource request node and the resource providing node in the blockchain database prior to creating the transaction contract.

20. The method according to claim 1, wherein determining that the transaction settlement instruction is valid further includes verifying a respective blockchain account for each of the resource request node and the resource providing node.

* * * * *